(12) United States Patent
Pham

(10) Patent No.: US 6,446,173 B1
(45) Date of Patent: Sep. 3, 2002

(54) MEMORY CONTROLLER IN A MULTI-PORT BRIDGE FOR A LOCAL AREA NETWORK

(75) Inventor: Son Minh Pham, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/025,355

(22) Filed: Feb. 18, 1998

Related U.S. Application Data

(60) Provisional application No. 60/059,171, filed on Sep. 17, 1997.

(51) Int. Cl.$^7$ .............................................. G06F 15/16
(52) U.S. Cl. ........................ 711/147; 711/148; 711/149; 709/238; 709/245; 710/100
(58) Field of Search ............................ 711/3, 147, 148, 711/149, 167; 709/238, 245; 710/100

(56) References Cited

U.S. PATENT DOCUMENTS

| | | | |
|---|---|---|---|
| 3,735,357 A | 5/1973 | Maholick et al. | 340/172.5 |
| 4,710,769 A | 12/1987 | Friedman et al. | 340/825.03 |
| 5,027,350 A | 6/1991 | Marshall | 370/401 |
| 5,151,994 A | 9/1992 | Wille et al. | 710/116 |
| 5,229,993 A | 7/1993 | Foudriat et al. | 370/445 |
| 5,307,345 A | 4/1994 | Lozowick et al. | 370/428 |
| 5,339,316 A | 8/1994 | Diepstraten | 370/401 |
| 5,353,353 A | 10/1994 | Vijeh et al. | 380/29 |
| 5,404,459 A | 4/1995 | Gulick et al. | 710/61 |
| 5,410,754 A | 4/1995 | Klotzbach et al. | 370/466 |
| 5,432,511 A | 7/1995 | Sadjadian et al. | 341/61 |
| 5,442,578 A | 8/1995 | Hattori | 708/492 |
| 5,448,565 A | 9/1995 | Chang et al. | 370/402 |
| 5,481,540 A | 1/1996 | Huang | 370/402 |
| 5,515,376 A | 5/1996 | Murthy et al. | 370/402 |
| 5,515,513 A | 5/1996 | Metzger et al. | 709/249 |

(List continued on next page.)

FOREIGN PATENT DOCUMENTS

| | | |
|---|---|---|
| EP | 0 397 188 A2 | 11/1990 |
| EP | 0597789 A1 | 5/1994 |
| EP | 0 609 626 A2 | 8/1994 |
| EP | 0785698 A2 | 7/1997 |
| WO | WO 96/13922 | 5/1996 |
| WO | WO 96/21302 | 7/1996 |
| WO | WO 97/18657 | 5/1997 |

*Primary Examiner*—Than Nguyen
(74) *Attorney, Agent, or Firm*—Haverstock & Owens LLP

(57) ABSTRACT

A memory controller in a multi-port bridge for a local area network. The multi-port bridge includes a switch engine, a memory and a plurality of ports, all of which are interconnected by a high speed communication bus. The memory includes look-up tables utilized for appropriately directing data packets among the ports, packet buffers utilized for temporarily storing packets and mailboxes for providing an interface between the switch engine and an external processor. The switch engine includes the memory controller, a bus controller and a look-up controller, each preferably including a finite state machine. The memory controller provides an interface between the memory and the communication bus by including a command decoder for decoding bus commands received from the communication bus. For example, the command decoder provides a response to memory read and write bus commands. In addition, the memory controller includes a memory control finite state machine for controlling operation of the memory controller according to the bus commands received from the command decoder. The memory controller also includes logic and address registers for providing appropriate row and column addresses to the memory device according to a current state of the memory control finite state machine. Because the memory control finite state machine controls operation of the memory controller, memory read and write operations are performed with a minimum of delay, thereby increasing the throughput capacity of the multi-port bridge.

28 Claims, 10 Drawing Sheets

U.S. PATENT DOCUMENTS

| | | | |
|---|---|---|---|
| 5,517,494 A | 5/1996 | Green | 370/408 |
| 5,522,059 A | 5/1996 | Marushima et al. | 711/149 |
| 5,559,796 A | 9/1996 | Edem et al. | 370/412 |
| 5,565,929 A | 10/1996 | Tanaka | 348/565 |
| 5,568,643 A | 10/1996 | Tanaka | 710/266 |
| 5,570,330 A | 10/1996 | Okawa | 369/44.32 |
| 5,570,466 A | 10/1996 | Oechsle | 709/238 |
| 5,598,161 A | 1/1997 | Yamada | 341/159 |
| 5,598,581 A | 1/1997 | Daines et al. | 710/52 |
| 5,600,664 A | 2/1997 | Hayashi | 714/794 |
| 5,602,851 A | 2/1997 | Terashita et al. | 370/403 |
| 5,617,421 A | 4/1997 | Chin et al. | 370/402 |
| 5,621,725 A | 4/1997 | Kawamura et al. | 370/300 |
| 5,623,645 A * | 4/1997 | Yip et al. | 710/100 |
| 5,640,399 A | 6/1997 | Rostoker et al. | 370/392 |
| 5,649,175 A * | 7/1997 | Kanekal et al. | 710/61 |
| 5,680,622 A | 10/1997 | Even | 395/709 |
| 5,721,927 A | 2/1998 | Baraz et al. | 395/705 |
| 5,761,435 A | 6/1998 | Fukuda et al. | 709/238 |
| 5,764,895 A | 6/1998 | Chung | 709/250 |
| 5,802,047 A | 9/1998 | Kinoshita | 370/359 |
| 5,805,816 A | 9/1998 | Picazo, Jr. et al. | 395/200.53 |
| 5,844,903 A | 12/1998 | Terashita et al. | 370/403 |
| 5,852,607 A | 12/1998 | Chin | 370/401 |
| 5,857,075 A | 1/1999 | Chung | 709/223 |
| 5,859,837 A | 1/1999 | Crayford | 370/230 |
| 5,878,028 A | 3/1999 | Roy et al. | 370/235 |
| 5,884,040 A | 3/1999 | Chung | 709/227 |
| 5,917,821 A | 6/1999 | Gobuyan et al. | 370/392 |
| 5,923,654 A | 7/1999 | Schnell | 370/390 |
| 5,923,660 A | 7/1999 | Shemla et al. | 370/402 |
| 5,926,473 A | 7/1999 | Gridley | 370/389 |
| 5,940,596 A | 8/1999 | Rajan et al. | 340/825.52 |
| 5,940,597 A | 8/1999 | Chung | 711/149 |
| 5,949,788 A | 9/1999 | Friedman et al. | 370/431 |
| 5,951,651 A | 9/1999 | Lakshman et al. | 709/239 |
| 5,978,378 A | 11/1999 | Van Seters et al. | 370/401 |
| 5,991,305 A | 11/1999 | Simmons et al. | 370/422 |
| 6,018,526 A | 1/2000 | Liu et al. | 370/401 |
| 6,044,080 A | 3/2000 | Antonov | 370/401 |
| 6,067,300 A | 5/2000 | Baumert et al. | 370/413 |
| 6,070,205 A | 5/2000 | Kato et al. | 710/100 |
| 6,075,773 A | 6/2000 | Clark et al. | 370/241 |
| 6,081,532 A | 6/2000 | Fiammante | 370/401 |
| 6,084,877 A | 7/2000 | Egbert et al. | 370/389 |
| 6,088,356 A | 7/2000 | Hendel et al. | 370/392 |
| 6,091,725 A | 7/2000 | Cheriton et al. | 370/392 |
| 6,094,434 A | 7/2000 | Kotzur et al. | 370/401 |
| 6,098,110 A | 8/2000 | Witkowski et al. | 709/249 |
| 6,108,345 A | 8/2000 | Zhang | 370/445 |
| 6,111,874 A | 8/2000 | Kerstein | 370/389 |
| 6,122,277 A | 9/2000 | Garmire et al. | 370/390 |
| 6,130,891 A | 10/2000 | Lam et al. | 370/401 |
| 6,137,797 A | 10/2000 | Bass et al. | 370/392 |
| 6,247,102 B1 * | 6/2001 | Chin et al. | 711/126 |
| 6,308,218 B1 * | 10/2001 | Vasa | 709/238 |

* cited by examiner

MEMORY CONTROLLER IN A MULTI-PORT BRIDGE FOR A LOCAL AREA NETWORK

This application claims the benefit of U.S. Provisional Application No. 60/059,171, filed Sep. 17, 1997, entitled, "MULTI-PORT BRIDGE FOR A LOCAL AREA NETWORK."

FIELD OF THE INVENTION

The invention relates to a multi-port bridge for a local area network. More particularly, the invention relates to a memory controller in a multi-port bridge for a local area network.

BACKGROUND OF THE INVENTION

Nodes of a local area network (LAN) are typically interconnected by a shared transmission medium. The amount of data traffic that the shared transmission medium can accommodate, however, is limited. For example, only one node at a time can successfully transmit data to another node over the shared transmission medium. If two or more nodes simultaneously attempt to transmit data, a data collision occurs, which tends to corrupt the data being transmitted. Thus, nodes that share a transmission medium are considered to be in a same collision domain.

A multi-port bridge allows simultaneous communication between nodes of the LAN by segmenting the LAN into multiple collision domains (also referred to as network segments), each segment having a corresponding transmission medium. FIG. 1 illustrates a conventional local area network (LAN) including a multi-port bridge 20. The multi-port bridge 20 in this example has eight ports A–H, though the number of ports can vary. Each port A–H is connected to a segment 21–28 of the LAN. Each segment 21–28 typically includes one or more nodes 29–44, such as a workstation, a personal computer, a data terminal, a file server, a printer, a facsimile, a scanner or other conventional digital device. Each of the nodes 29–44 has an associated node address which uniquely identifies the node. The nodes 29–44 are configured to send data, one to another.

When the LAN operates according to Ethernet standards, such as the Institute of Electrical and Electronics Engineers (IEEE) 802.3 standard, data is communicated in the form of discrete packets. FIG. 2 illustrates a conventional IEEE 802.3 data packet 50. The data packet 50 includes an eight byte long pre-amble 51 which is generally utilized for synchronizing a receiver to the data packet 50. The preamble includes seven bytes of preamble and one byte of start-of-frame. Following the pre-amble 51, the data packet 50 includes a six byte long destination address 52, which is the node address of a node which is an intended recipient for the data packet 50. Next, the data packet 50 includes a six byte long source address 53, which is the node address of a node which originated the data packet 50. Following the source address 53 is a two-byte length field 54. Following the length field 54 is a data field 55. The data field 55 can be up to 1500 bytes long. Finally, the data packet 50 includes a four-byte frame check field 56 which allows a recipient of the data packet 50 to determine whether an error has occurred during transmission of the data packet 50.

When a node (source node) sends data to another node (destination node) located on its same segment of the LAN (intra-segment communication), the data is communicated directly between the nodes without intervention by the multi-port bridge 20 and is known as an intra-segment packet. Therefore, when the multi-port bridge 20 receives an intra-segment packet, the multi-port bridge 20 does not bridge the packet (the packet is filtered). When a node (source node) sends a data packet to another node (destination node) located on a different segment (inter-segment communication) the multi-port bridge 20 appropriately forwards the data packet to the destination node.

Memory is required in the multi-port bridge 20 for storing packets that are forwarded by the multi-port bridge 20. Therefore, what is needed is improved technique for controlling such memory.

SUMMARY OF THE INVENTION

The invention is a memory controller in a multi-port bridge for a local area network. The multi-port bridge includes a switch engine, a memory and a plurality of ports, all of which are interconnected by a high speed communication bus. The memory includes look-up tables utilized for appropriately directing data packets among the ports, packet buffers utilized for temporarily storing packets and mailboxes for providing an interface between the switch engine and an external processor. The switch engine includes the memory controller, a bus controller and a look-up controller, each preferably including a finite state machine.

The memory controller according to the present invention provides an interface between the memory and the communication bus by including a command decoder for decoding bus commands received from the communication bus. For example, the command decoder provides a response to memory read and write bus commands. In addition, the memory controller includes a memory control finite state machine for controlling operation of the memory controller according to the bus commands received from the command decoder. The memory controller also includes logic and address registers for providing appropriate row and column addresses to the memory device according to a current state of the memory control finite state machine. Because the memory control finite state machine controls operation of the memory controller, memory read and write operations are performed with a minimum of delay, thereby increasing the throughput capacity of the multi-port bridge.

The bus controller controls access to the communication bus by collecting requests and granting the requests according to an appropriate priority. The look-up controller determines to which port each packet is to be directed based upon the destination node address for the packet. The high speed communication bus includes single bit signal lines dedicated to communicating control commands, signal lines dedicated to communicating data, and several signal lines having special purposes. For example, two signal lines are preferably dedicated to initiating access to the bus, each having a respective priority, another signal line is dedicated to jam requests (for applying backpressure), still another signal line is dedicated to the memory controller and yet another signal line is dedicated to providing a bus clock signal.

Each port includes a port controller, a MAC transceiver, a receive finite state machine, a transmit finite state machine, a receive buffer, a transmit buffer and a memory pointer buffer. Packets received from a LAN segment by the transceiver are directed to the communication bus through the receive buffer, while packets to be transmitted over the LAN segment are directed to the transceiver through the transmit buffer. The memory pointer buffer stores memory pointers in a queue for transmission by the port, one memory pointer for each data packet being stored in the packet buffers of the memory.

A data packet originating from a node (source node) in a segment of the LAN is received by the receive buffer of a corresponding one of the ports (source port) of the multi-port bridge. As the packet is still being received, the look-up tables are utilized to determine which is the appropriate destination port for the packet based upon the destination address.

The communication bus is monitored by each port. The look-up controller indicates which are the destination ports for the packet via the communication bus. If the source port and the destination port are the same, this indicates that the source and destination nodes are on the same segment of the LAN (intra-segment communication) and the packet is filtered. Otherwise, if the port identified as the destination port is not currently busy transmitting or receiving another packet, the destination port configures itself to receive the packet directly from the source port (cut-through).

However, if the memory pointer buffer is nearly full, the port controller of the destination port applies a jam request signal to the communication bus. The source port receives the jam request and, in response, discards the incoming packet and also sends a jam signal over its associated segment. The jam signal causes the node (source node) which is the source of the packet to discontinue sending the packet and attempt to resend the packet after a waiting period.

Assuming the memory pointer buffer for the destination port is not nearly full (no jam request is made), the packet is loaded from the receive buffer of the source port into the packet buffers of the memory starting at the memory address identified in the memory pointer. Writing of the packet into the packet buffers preferably occurs as the remainder of the packet is still being received into the receive buffer of the source port. For this reason, the receive buffer for each port need not be capable of storing the entire data packet. In addition, if the destination port is configured for cut-through, the destination port receives the packet into its transmit buffer directly from the communication bus simultaneously with the write cycles for loading of the packet into the packet buffers. During such a cut-through operation, the packet is received into a transmit buffer of the destination port for immediate transmission to the LAN segment associated with the destination port.

Once the entire packet has been loaded into the packet buffers, the memory pointer is placed on the data lines of the communication bus. Each destination port stores the memory pointer in its memory pointer buffer. Thus, the packet is queued for transmission by the destination port. Then, when the destination port is no longer busy, the destination port retrieves the packet from the packet buffers.

While the destination port is receiving the packet into its transmit buffer from the packet buffers or directly from the source port, the destination port begins transmitting the packet to the network segment associated with the destination port. For this reason, the transmit buffer for each port need not be capable of storing an entire data packet. The destination node for the packet then begins to receive the packet from the network segment.

The memory controller according to the present invention, therefore, plays a central role in operation of the multi-port bridge by providing rapid memory access and by requiring only a minimum of activity on the communication bus for initiating memory read and write cycles. Accordingly, the multi-port bridge has a high packet handling capacity.

DETAILED DESCRIPTION OF A PREFERRED EMBODIMENT

The following documents are hereby incorporated by reference:, U.S. patent application Ser. No. 08/590,125, filed Jan. 23, 1996 now U.S. Pat. No. 5,764,895; U.S. patent application Ser. No. 08/371,499, filed Jan. 11, 1995; U.S. patent application Ser. No 08/947,081, filed Oct. 8, 1997, and entitled, "METHOD AND APPARATUS FOR PERIODICALLY UPDATING ENTRIES IN A CONTENT ADDRESSABLE MEMORY"now U.S. Pat. No. 5,940,597; U.S. patent application Ser. No. 08/946,866, filed Oct. 8, 1997, and entitled, "PER-PACKET JAMMING IN A MULTI-PORT BRIDGE FOR A LOCAL AREA NETWORK", now U.S. Pat. No. 5,884,040.

Figure 3:
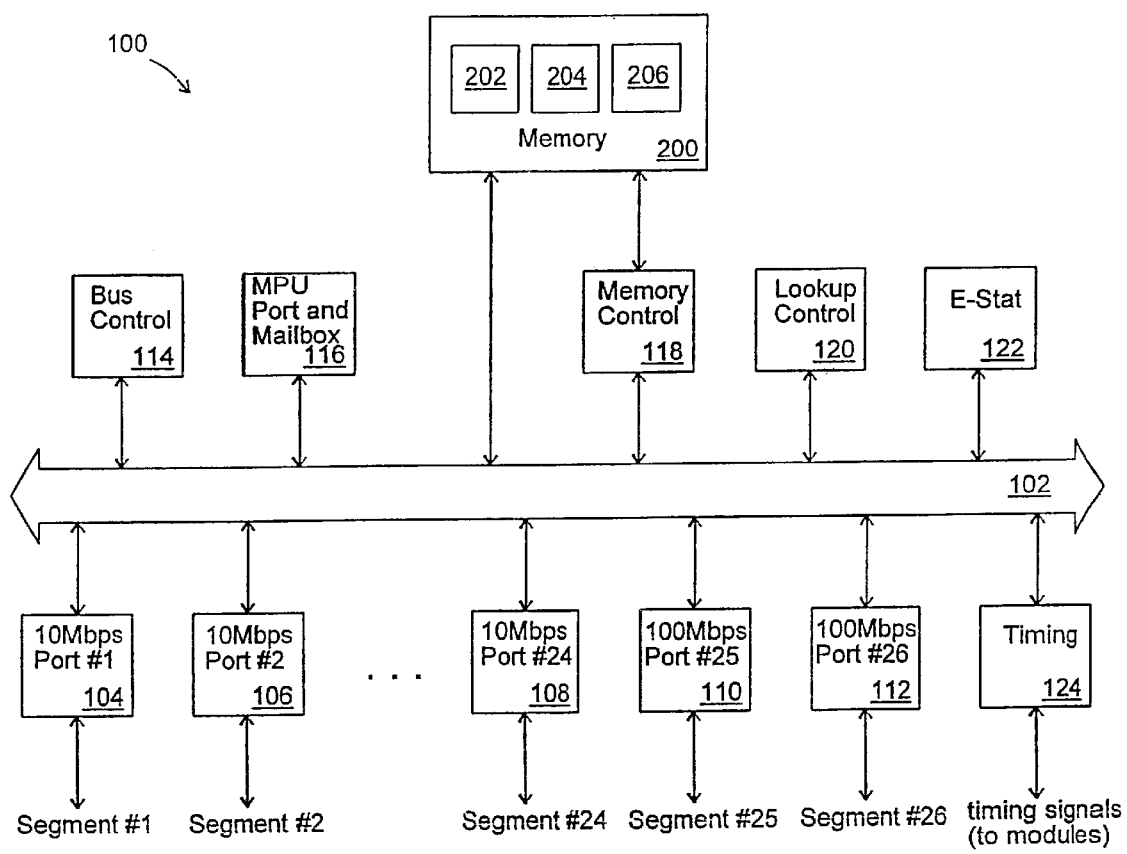
FIG. 3 illustrates a block schematic diagram of a switch engine for a multi-port bridge according to the present invention.

FIG. 3 illustrates a block schematic diagram of a switch engine 100 for a multi-port bridge according to the present invention. A high speed communication bus 102 provides an interconnection for each of the functional blocks 104–124 of the switch engine 100. According to the preferred embodiment, twenty-four 10 Mbps ports 104–108 and two 100 Mbps ports 110–112 are each coupled to the communication bus 102 and can be coupled to a respective LAN segment, each LAN segment having one or more nodes. Each of the twenty-four 10 Mbps ports 104–108 transmit and receive data packets at a rate of 10 Mbps, whereas, the two 100 Mbps ports 110–112 transmit and receive data packets at a rate of 100 Mbps. It., will be apparent, however, that other numbers of ports and other port configurations can be utilized.

A bus control module 114 controls access to the communication bus 102 by collecting requests from the ports 104–112 and from the other modules. Based upon the requests, the bus control module 114 grants access to the communication bus 102 according to an appropriate priority, as explained herein. The bus control module 114 also controls access to a memory device 200 by an external processor 600 (FIG. 9), as explained herein. An MPU port and mailbox module 116 provides an interface between the switch engine 100 and the external processor 600 for performing various functions, as is also explained herein. These functions include loading data into registers of the switch engine 100, reading data from registers of the switch engine 100 and transferring data packets between the external processor 600 and the ports 104–112 of the switch engine 100.

A memory control module 118 provides an interface between the memory device 200 and the communication bus 102 and also provides an interface between the memory device 200 and a look-up control module 120. The memory device 200 includes mailboxes 202 for exchanging information between the external processor 600 (FIG. 9) and the switch engine 100. In addition, the memory device 200 includes look-up tables 204. The look-up tables 204 include entries which indicate which port of the multi-port bridge is associated with each node of the LAN and also include group addresses for multi-cast packets. The look-up tables 204 are utilized for appropriately directing data packets received by the switch engine 100 among the ports 104–112.

The look-up control module 120 receives addresses of nodes and associated port identifications to be stored in the look-up tables 204 from the communication bus 102. These addresses and identifications are stored in the look-up tables 204. The look-up control module 120 also facilitates utilizing the look-up tables 204 for directing packets among the ports 104–112 based upon the destination address of each packet.

The memory device 200 also includes packet buffers 206 for temporarily storing data packets that are being directed through the multi-port bridge. The memory device 200 is preferably an SDRAM device, though other types of memory devices can be utilized, such as DRAM, SRAM, RAM or EDO. In the case of dynamic memory, the memory control module 118 refreshes the memory device 200 as required.

An E-stat module 122 collects data packet routing statistics and provides them to the external processor 600 (FIG. 9) for performing analysis and network management functions. A timing module 124 provides timing signals to the ports 104–112 and to the other modules 114–122 of the switch engine 100. Preferably, a primary clock signal cycles at 40 MHz. Other clock signals, at 10 MHz and 25 MHz, are derived from the primary clock signal.

Preferably, the modules 114–124 are each implemented as a finite state machine, though the modules 114–124 can alternately be implemented as one or more processors or controllers operating according to stored software programs. Finite state machines are preferred, however, as they can generally perform the necessary operations faster, thus, resulting in a higher packet handling bandwidth for the switch engine 100.

Figure 4:
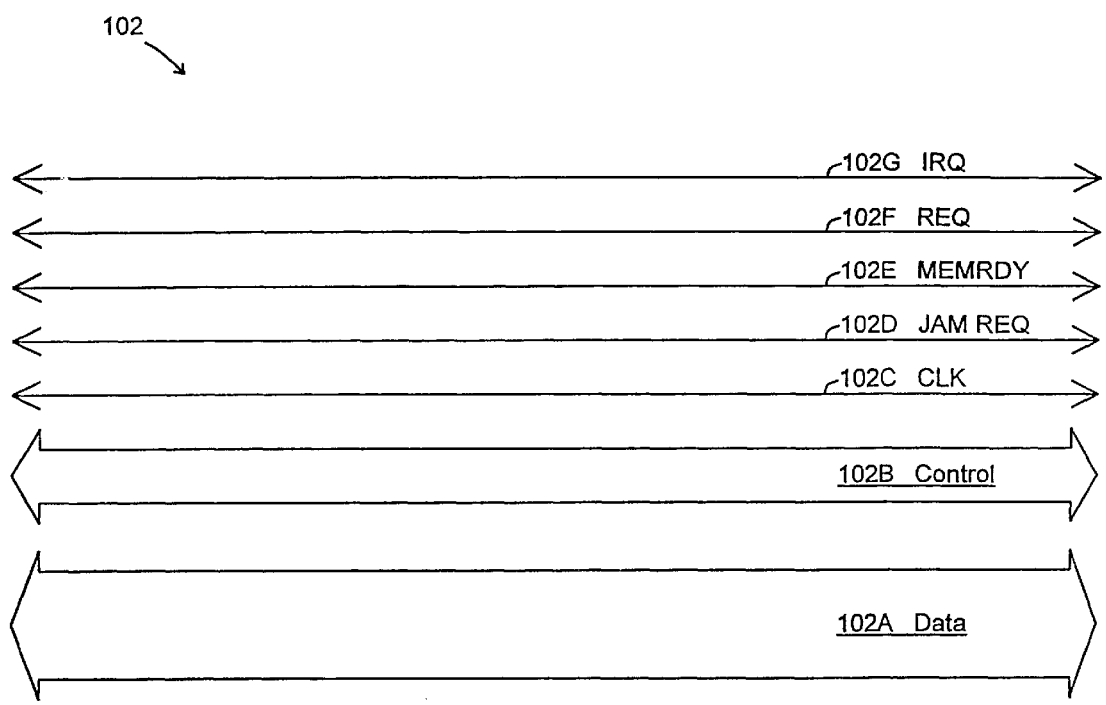
FIG. 4 illustrates a diagram of signal lines included in a high speed communication bus according to the present invention.

FIG. 4 illustrates a diagram of the signal lines included in the high speed communication bus 102 of FIG. 3. The communication bus 102 preferably includes thirty-two data lines 102A, five control lines 102B, a clock CLK line 102C, a jam request JAM REQ line 102D, a memory ready MEMRDY line 102E, a request REQ line 102F and an interrupt; IRQ line 102G, though it will be apparent that other bus configurations can be utilized.

Table 1 illustrates preferred commands and associated data appearing on the communication bus 102 during operation of the multi-port bridge, as explained herein.

TABLE 1

| Control Code | Data 31–24 | Data 23–0 | Description |
|---|---|---|---|
| 00 Hex | | | transfer in progress/no action |
| 01 | # of transfer | starting memory address | memory read |
| 02 | # of transfer | starting memory address | memory write |
| 03 | source port ID & dest. and source addresses | | look-up |
| 04 | signal line of port granted access | | bus-grant-for-REQ |
| 05 | signal lines of all interrupting ports | | poll-interrupt |
| 06 | signal lines of all requesting ports | | poll-request |
| 07 | | | reserved |
| 08 | source port ID & bit-map of all dest. ports | | look-up ready |
| 09 | source port ID & dest. and source addresses | | look-up (gated with MEMRDY) |
| 0A | | | reserved |
| 0B | | | reserved |
| 0C | register data | | register load |
| 0D | register data | | register read |
| 0E | | | reserved |
| 0F | last transfer (as previously defined) | | bus-release |
| 10 | source port ID & dest. port ID | | new packet transfer to memory (cut-through possible) |
| 11 | source port ID & dest. port ID | | cont. packet transfer to memory (cut-through not possible) |
| 12 | # of transfer | memory starting address | write packet header to memory |
| 13 | | | reserved |
| 14 | signal line of port granted access | | bus-grant-for-IRQ |

Referring to Table 1, the Control Codes (commands) placed on the control lines 102B are given as hexadecimal values, while the associated data applied to the data lines 102A and the function performed by each command are described. Because there are five control lines 102B, there can be up to thirty-two different commands (between 00 H and 1F H). As shown in Table 1, however, fewer commands are preferred. Table 1 shows hexadecimal values for the preferred embodiment. It will be apparent, however, that other bit assignments and another set of commands can be implemented and still follow the teachings of the present invention.

Figure 5:
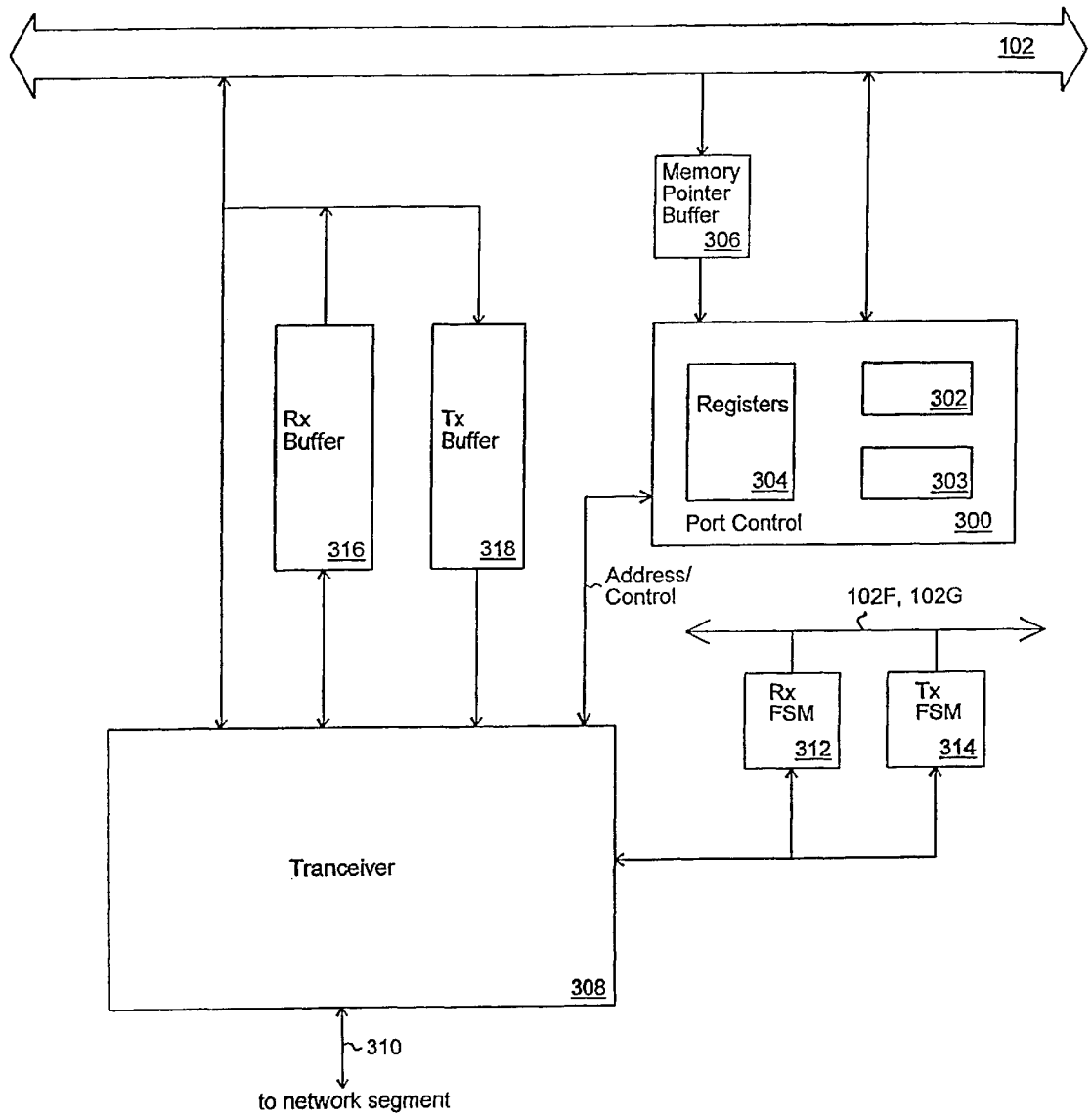
FIG. 5 illustrates a block schematic diagram of a port of the switch engine according to the present invention.

FIG. 5 illustrates a block schematic diagram of one of the ports 104–112 of the switch engine 100 of FIG. 3. A port controller 300, including a bus interface 302, a memory pointer finite state machine (FSM) 303 and registers 304, provides control for the port and an interface between the port and the communication bus 102. The port controller 300 monitors the communication bus 102 for commands and data and also provides commands and data to the communication bus 102 at times when the port has control of the communication bus 102. The registers 304 contain data for configuring the port, initializing the port upon start-up, and for collecting status information for the port. An address latch included in the registers 304 latches addresses from the communication bus 102 and provides them to the transceiver 308. The registers 304 also contain a counter for storing a current state of the finite state machine of the port and registers for storing parameters for use by the finite state machines of the port.

Each port also includes a memory pointer FIFO buffer 306 coupled between the communication bus 102 and the port controller 300. The memory pointer buffer 306 stores memory pointers (explained herein) for data packets being queued in the packet buffers 206 (FIG. 3) of the memory device 200. Preferably, the memory pointers each have a predefined length. In addition, the memory pointer buffer 306 preferably holds 128 memory pointers, though it will be apparent that another capacity for the memory pointer buffer 306 can be selected.

The port also includes a medium access control (MAC) transceiver 308 which accesses a LAN segment 310 for transmitting and receiving data packets to and from the LAN segment 310. Associated with and coupled to the transceiver 308 are a receive finite state machine 312, for controlling the transceiver 308 during packet reception, and a transmit finite state machine 314, for controlling the transceiver 308 during packet transmission.

Packets received from the network segment 310 by the transceiver 308 are directed to the communication bus 102 through a receive FIFO buffer 316, while packets to be transmitted over the LAN segment 310 are directed from the communication bus 102 to the transceiver 308 through a transmit FIFO buffer 318. Preferably, the receive buffer 316 holds 128 bytes while the transmit buffer 318 holds 256 bytes, though other capacities can be selected. Note that an IEEE 802.3 data packet can include up to 1500 bytes of data in addition to the source address, the destination address and the frame check field. Thus, in the preferred embodiment, neither the receive buffer 316, nor the transmit buffer 318 is capable of storing a entire IEEE 802.3 data packet of the maximum size. The receive finite state machine 312 and the transmit finite state machine 314 are each coupled to the bus control module 114 (FIG. 3) for initiating access to the communication bus 102 by the port.

Access to the communication bus 102 is obtained in the following manner. The bus control module 114 monitors the interrupt IRQ line 102G and the request REQ line 102F. A port requiring access to the bus 102 raises the IRQ line 102G or the request REQ line 102F, depending upon the circumstances. The bus control module 114 grants access to the bus 102 in an appropriate priority. Preferably, an interrupt IRQ is granted access to the bus 102 according to a higher priority than a request REQ. Ports having a higher data rate have a higher priority than ports having a lower data rate. For example, the 100 Mbps ports 110–112 have a higher priority than the 10 Mbps ports 104–108. Further, assuming equal data rates, a port serviced more recently has a lower priority than a port serviced less recently.

When the bus is available after receiving an interrupt IRQ, the bus control module 114 responds to the interrupt IRQ by placing a poll-interrupt command 05 H (Table 1) on the control lines 102B of the bus 102. While the poll-interrupt command 05 H is on the control lines 102B, each port having a pending interrupt IRQ raises a corresponding one signal line of the data lines 102A. For this purpose, each of the ports 104–112 and the MPU Port and Mailbox 100 are assigned a respective one signal line of the data lines 102A. Accordingly, the bus control module 114 discovers which of the ports has a pending interrupt by monitoring the data lines 102A while the poll-interrupt command 05 H is active. The bus control module 114 then grants access to the bus 102 in an appropriate priority by placing a bus-grant-for-IRQ command 14 H (Table 1) on the control lines 102B of the bus 102 and also raises the respective one signal line of the data lines 102A that corresponds to the port being granted access to the bus 102. Upon being granted access to the bus 102, the designated port then has control of the bus 102.

Similarly, when the bus 102 is available after receiving a request REQ, the bus control module 114 places a poll-request command 06 H (Table 1) on the control lines 102B of the bus 102. While the poll-request command 06 H is on the control lines 102B, each port having a pending request REQ raises its corresponding one signal line of the data lines 102A. The bus control module 114 discovers which of the ports has a pending request by monitoring the data lines 102A while the poll-request command 06 H is active. The bus control module 114 then grants access to the bus 102 in an appropriate priority by placing a bus-grant-for-REQ command 04 H (Table 1) on the control lines 102B of the bus 102 and also raises the one signal line of the data lines 102A that corresponds to the port being granted access to the bus 102. Upon being granted access to the bus 102, the designated port then has control of the bus 102.

Packet flow through the multi-port bridge 100 occurs in the following manner. A data packet, such as an IEEE 802.3 data packet, originating from a node (source node) in a segment of the local area network is received by a corresponding one of the ports 104–112 (source port) of the switch engine 100. The receive buffer 316 (FIG. 5) in the source port receives the data packet as the packet is being received by the transceiver 308 in the source port from the network segment associated with the source port. After the first twelve bytes, corresponding to the source address and the destination address for the packet, are received by the source port, the receive finite state machine 312 requests a look-up cycle from the bus control module 114 (FIG. 3) by raising the interrupt line IRQ (FIG. 4). The bus control module 114 monitors such requests, discovers the requesting port(s) via the poll-interrupt command 05 H and grants each request according to an appropriate priority via the bus-grant-for IRQ command 14 H, as explained above.

Upon obtaining access to the bus, the source port places a look-up command 03 H (Table 1) on the control lines 102B. During successive clock cycles while the look-up command 03 H is active, an identification of the source port, the destination node address from the packet and the source node address from the packet are transferred from the source, port to the look-up control module 120 (FIG. 3) via the data lines 102A. The source port identification, destination address and source address are transferred over the communication bus 102 in segments that are each four bytes long as this corresponds to the width (32 bits) of the data lines 102A of the communication bus 102. Preferably, this transfer is completed in four clock cycles. It will be apparent, however, that the communication bus 102 can have a different number of data lines, in which case, a different number of bytes can be transferred at a time.

Once the look-up control module 120 has received the source port identification, the destination address and the source address for the packet, the look-up control module 120 so notifies the memory control module 118 (FIG. 3). The memory control module 118 and look-up control module 120 then update the look-up tables 204 (FIG. 3) by ensuring that the source node address for the packet is stored in the look-up tables 204 in association with the source port identification for the packet. This ensures that the look-up tables 204 accurately reflect any changes that may have occurred in the network (this is referred to as a learning cycle). The information stored during the learning cycle is utilized for directing subsequent packets.

Once the learning cycle is complete, the memory control module 118 and the look-up control module 120 utilize the look-up tables 204 to determine which port (destination port) is associated with the destination address for the packet. If the packet is a multi-cast packet (multiple destination ports) or a broadcast packet (all ports except the source port are destination ports), the look-up control module 120 will determine which are the multiple destination ports for the packet. Once the look-up cycle is complete, the look-up control module 120 places a look-up ready command 08 H (Table 1) on the control lines 102B of the bus 102 and, while the look-up ready command 08 H is active, the look-up control module 120 raises the respective signal lines of the data lines 102A of all the ports which are determined to be destination ports for the packet.

Figure 6:
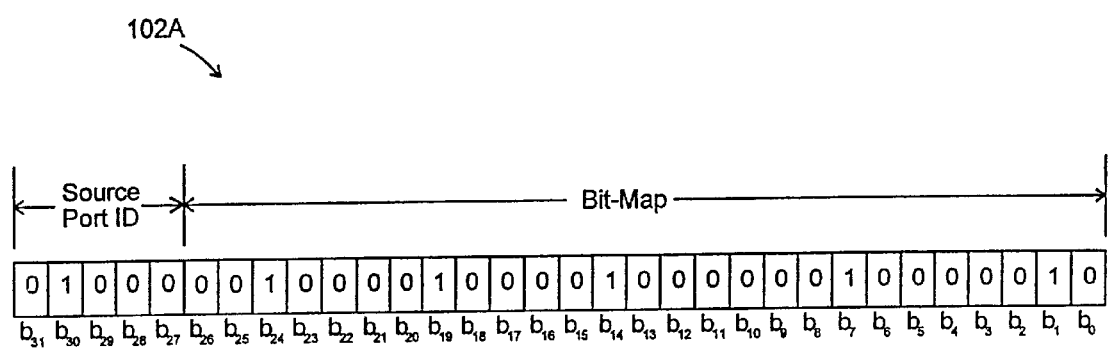
FIG. 6 illustrates a bit-map of the destination ports appearing on the high speed communication bus during a look-up ready command according to the present invention.

This raising of the respective signal lines is referred to as a bit-map of the destination ports. FIG. 6 illustrates logic levels for each of the thirty-two data lines 102A, of the bus 102 during the look-up ready command 08 H. Each one of the twenty-six ports 104–112 and the external processor 600 are assigned to a respective one of the signal lines $b_0$–$b_{31}$. Thus, for example, the external processor 600 is assigned to signal line $b_{26}$, while port #1 is assigned to signal line $b_0$, port #2 is assigned to signal line $b_1$, port #3 is assigned to signal line $b_2$, and so forth, with port #26 assigned to signal line $b_{25}$. In the preferred embodiment, signal lines $b_{27}$–$b_{31}$ are not included in the bit-map. Rather, the signal lines $b_{27}$–$b_{31}$ identify the source port. It will be apparent that a multi-port bridge, however, could include more of fewer ports, in which case, the bit assignments would be different.

Assume that the look-up cycle for a packet having port #9 as its source port determines that the packet is multi-cast having destination nodes associated with destination ports #1, #7, #12, #19 and #24. Therefore, during the look-up ready command 08 H, the bit-map of the destination ports will include logic one's for signal lines $b_0$, $b_6$, $b_{11}$, $b_{18}$ and $b_{23}$; signal lines $b_{27}$–$b_{31}$ identify port #9 as the source port; and the remaining signal lines $b_1$–$b_5$, $b_7$, $b_9$–$b_{10}$, $b_{12}$–$b_{17}$, $b_{19}$–$b_{22}$ and $b_{24}$–$b_{26}$ are logic zeros.

Each port monitors the communication bus 102 for the look-up ready command 08 H appearing on the control lines 102B and the associated bit-map of the destination ports appearing on the data lines 102A. The bit-map allows each destination port for the packet to be simultaneously notified of its status as a destination port. If the source port for the packet is also designated as the only destination port for the packet during the look-up ready command 08 H, this indicates that the destination node for the packet is in the same network segment as the source node (intra-segment communication). As such, the source port should not retransmit the packet because the destination node would have already received the packet at the same time that the source port received the packet. When this occurs and the packet has single destination, the packet is filtered. To filter the packet, the source port preferably takes no further action relative to the packet.

If any destination port having its signal line raised during the look-up ready command 08 H has a memory pointer buffer 306 that is full or nearly full, such destination port raises the JAM REQ line 102D (FIG. 4) while the look-up ready command 08 H is still active. During the look-up ready command 08 H, the source port monitors the JAM REQ line 102D for such a jam request. In response to a jam request, the source port discards the incoming packet and also sends a jam signal over its associated segment. The jam signal will cause the node (source node) which is the source of the packet to discontinue sending the packet and attempt to resend the packet after a waiting period.

Once the look-up ready command 08 H is no longer active, the source port for the packet places a bus-release command 0F H (Table 1) on the control lines 102B of the data bus 102. This releases control of the bus 102 by indicating to the bus control module 114 that the bus is available.

The bus control module 114 then responds to any pending interrupts or requests for access to the bus 102 by granting access to the bus in an appropriate priority. Thus, while the packet is still being received by the source port, but after the determination is made whether to filter or jam the incoming packet, the bus 102 can be utilized for other purposes.

Meanwhile, returning to the example, the packet continues being received by the source port. Once 64 bytes of the packet have been received, the source port requests access to the bus again, this time by raising the REQ line 102F. The bus control module 114 grants access to the source port in an appropriate priority by placing a bus-grant-for-REQ command 04 H on the control lines 102B and raises the signal line corresponding to the source port.

The packet buffers 206 include a space allocated to each port for storing packets received by the port. Each port controller 300 keeps track of the space allocated to the port and determines a location in the packet buffers 206 for each packet received by the port. Preferably, the packets are written into the allocated space in a circular fashion; each new packet overwrites portions of the oldest packet in the allocated space.

The source port initiates a series of memory write cycles for loading the packet from the receive buffer 316 of the source port into the allocated space in the packet buffers 206 by first placing a new packet transfer command 10 H (Table 1) on the control lines 102B and by placing the source port ID and the bit-map for the destination ports on the data lines 102A (raising the signal lines corresponding to each destination port for the packet). If any destination port having its signal line raised during new packet transfer command 10 H is not currently busy transmitting or receiving another packet, such destination port configures itself to receive the packet directly from the source port (cut-through). Destination ports that are currently busy ignore the packet for now and retrieve the packet from the packet buffers 206 later, when they are no longer busy.

Following the new packet transfer command 10 H, the source port places a memory write command 02 H (Table 1) on the control lines 102B of the bus 102. During a first bus clock cycle while the memory write command 02 H is active, the source port places on the data lines 102A one byte of information which indicates the number of bus cycles which will be required to complete the entire transfer. The number of bus cycles depends upon how much of the packet was received in the source port while the source port awaited access to the bus 102. Also during the first bus clock cycle while the memory write command 02 H is active, the source port places on the data lines 102A three bytes of information which indicates a starting address within the packet buffers 206 for the memory write cycles. The memory control module 118 receives this information for performing the memory write operation.

Simultaneously with the writing of the packet into the memory buffers 206, each destination port configured for cut-through receives packet directly from the bus 102 into its transmit FIFO 318 and immediately begins transmitting the packet to its associated network segment under control of its transmit finite state machine 314. The destination node for the packet then begins to receive the packet from the network segment.

In subsequent bus clock cycles while the memory write command 02 H is active, the source port places the packet on the data lines 102A in four byte portions (corresponding to the width of the data lines 102A), one portion for each clock cycle, until the memory write operation is completed.

Simultaneously, destination ports configured for cut-though continue to receive the packet and continue to transmit the packet to their associated network segment. When the memory write operation is completed, the source port releases the bus via the bus-release command 0F H.

Once the next 64 bytes of the packet is received by the source port, the source port again requests access to the bus 102 by raising the REQ line 102F and initiates a next memory write operation for loading the packet into the packet buffers 206. The source port first places a continuation packet transfer command 11 H (Table 1) on the control lines 102B and, while the continuation packet command 11 H is active, the source port places the bit-map for the destination ports on the data lines 102A (raises the signal lines corresponding to each, destination port for the packet). Only those destination ports having their signal lines raised and that had already been receiving the packet directly from the source port (those destination ports configured for cut-through) will continue to receive the next installment of the packet directly from the source port. Other destination ports will continue to ignore the packet. This is true even if a destination port that was busy during the new packet transfer command 10 H has become available because such a port would not have obtained the first installment of the packet. Then, the source port places the memory write command 02 H on the data lines 102A and places one byte of information indicating the number of bus cycles required and three bytes indicating the starting address for this write operation. Then, the port releases the bus via the bus-release command 0F H. This process repeats, including requesting access to the bus and placing the continuation packet transfer command 10 H on the bus 102, for each successive 64 byte portion of the packet until the entire packet is loaded into the, packet buffers 206. Because writing of the packet in the packet buffers 206 preferably occurs as the remainder of the packet is still being received into the receive buffer 316 of the source port, the receive buffer 316 for each port need not be capable of storing an entire data packet.

The packet is preferably loaded into the packet buffers 206 a predetermined offset from an assigned starting address. This provides a location for storing a header for the packet once the packet has been completely loaded into the packet buffers 206. For example, the header includes an identification number assigned to the packet, an indication of the destination ports for the packet, the receive status for the packet, the length of the packet, the source node address for the packet and the destination node address for the packet. The receive status indicates whether or not the entire packet has been successfully received and loaded into the packet buffers 206. Preferably, the header is eight bytes long, though it will be apparent that another length can be selected for the header.

After the last data is transferred such that the entire packet has been stored in the packer buffers 206, the source port retains control of the bus 102 and stores the header for the packet in the packet buffers 206. This is accomplished by the source port placing a packet header command 12 H on the control lines 102B. During a first clock cycle while the packet header command 12 H is active, the source port places one byte of information indicating the number bus clock cycles required to write the entire header into the memory buffers 206 and places three bytes of information indicating the assigned starting address for the packet. During successive bus clock cycles, the header is written into the packet buffers 206 beginning at the assigned starting address.

Each port monitors the communication bus 102 for the packet header command 12 H. While the packet header command 12 H is active, each port receives the packet header information. Each port which is identified as a destination port in the packet header checks the receive status for the packet and, if the packet was successfully received and stored in the packet buffers 206 (FIG. 3), the destination port stores at least the assigned starting address for the packet in its memory pointer buffer 306 (FIG. 5). Preferably, the destination port also stores the identification number assigned to the packet in the memory pointer buffer 306 along with the assigned starting address for the packet. If the receive status indicates an error, however, the starting address in the packet buffers 206 is not stored and no further action is taken by the destination ports relative the packet. Finally, the source port releases control of the bus 102 via the bus release command 0F H. This completes the actions taken by the source port relative the packet.

Each port monitors its memory pointer buffer 306 and initiates retrieval of packets from the packet buffers 206. Thus, returning the example packet, as soon as the destination port becomes available, it removes the identification number for the packet and the assigned starting address for the packet from its memory pointer buffer 306. Then, the destination port requests access to the bus by raising the request line REQ. Once the bus control module grants access to the bus 102, via the bus-grant-for-REQ command 04 H, the destination port first retrieves the header for the packet from the packet buffers 206. Thus, the destination port initiates a read operation by placing a memory read command 01 H (Table 1) on the control lines 102B of the bus 102. During a first clock cycle while the memory read command 01 H is active, the destination port places on the data lines 102A of the bus 102 one byte of information indicating the number of bus clock cycles for the read operation (e.g. the number of transfers required to retrieved the header) and three bytes of information indicating the assigned starting address for the packet.

Once the packet header is retrieved from the packet buffers 206, the destination port checks the packet identification number that is included in the header retrieved. If the packet identification number retrieved from the packet buffers 206 does not match the packet identification number stored in the memory pointer buffer 306, this indicates that the packet became corrupted in the packet buffers 206 after it was stored. For example, if a portion of the packet was overwritten by later packet, the identification number will also be overwritten, such that it does not match the identification number stored in the memory pointer buffer 306 of the destination port. In addition, the destination port obtains the length of the packet so that it can determine the appropriate number of memory read cycles that will be required to transfer the entire packet.

While the destination port is retrieving the packet from the packet buffers 206, the destination port simultaneously transmits the packet to its associated segment under control of the transmit finite state machine 314. For this reason, the transmit FIFO 318 in each port need not be capable of storing more than a single packet of the maximum length. Preferably, the packet is retrieved from the packet buffers 206 in multiple installments until the entire packet has be retrieved from the packet buffers 206. An installment is initiated each time the transmit FIFO 318 is nearly empty. Each installment is retrieved by the destination port obtaining access to the bus 102; placing, a memory read command 01 H on the bus 102 while specifying a number of memory transfers required for the installment; and releasing the bus via the bus release command 0F H after performing the specified number of transfers. Accordingly, the transmit FIFO 318 preferably need not be capable of storing a packet of maximum length. Because the bus 102 is released between installments, other ports can access the bus for other purposes simultaneously with the destination port transmitting the packet to its associated network segment.

In the event that a cut-through or transmit operation was initiated, but was unsuccessful, the packet will need to be retransmitted by the destination port. For example, the cut-through or transmit operation may have been unsuccessful if a data collision occurred during transmission of the packet over the segment associated with the destination port. In such case, the packet is retrieved from the packet buffers 206 as described above and re-transmitted by the destination port.

While the destination port is receiving the packet into its transmit buffer 318 from the packet buffers 206, the destination port begins transmitting the packet to the LAN segment associated with the destination port. The packet is then received from the network segment by the destination node for the packet.

Thus, if the destination port is configured for cut-through, the destination port will receive the packet into its transmit buffer 318 directly from the communication bus 102 simultaneously with the write cycles for loading of the packet into the packet buffers 206. During such a cut-through operation, the packet is received into a transmit buffer 318 of the destination port for immediate transmission to the LAN segment associated with the destination port. If the packet is a broadcast or multi-cast packet, one or more of the destination ports can receive the packet directly from the source port, while one or more other destination ports for the packet can retrieve the packet from the packet buffers 206 once those destination ports are no longer busy.

Figure 7:
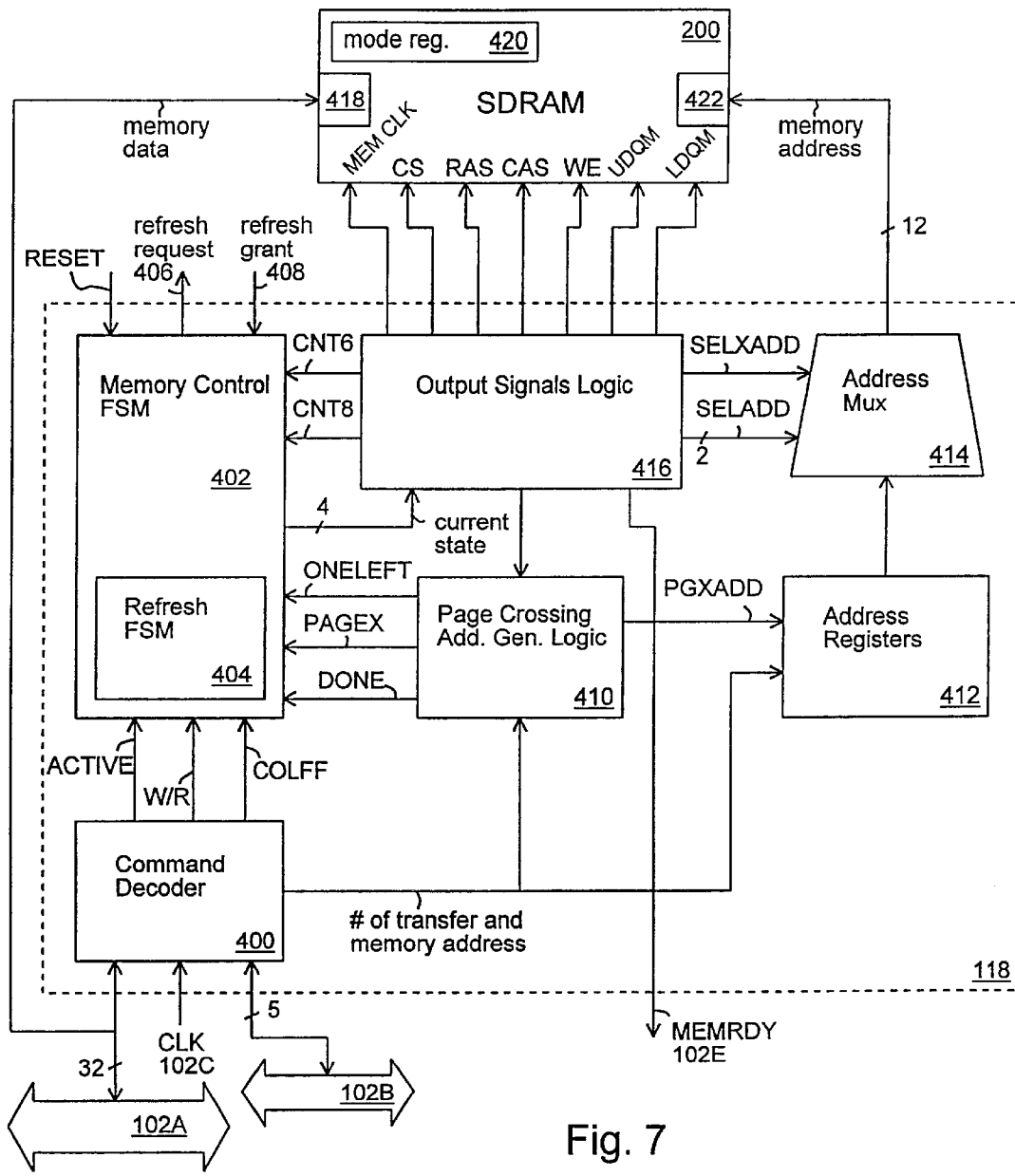
FIG. 7 illustrates a block schematic diagram of the memory control module, high speed bus and memory device according to the present invention.

FIG. 7 illustrates a block schematic diagram of the memory control module 118 (FIG. 3), data lines 102A (FIG. 4), control lines 102B (FIG. 4), clock CLK signal line 102C (FIG. 4), MEMRDY signal line 102E (FIG. 4) and memory device 200 (FIG. 3) according to the present invention. In the preferred embodiment, the memory device 200 includes a pair of 16 M-byte SDRAM memory devices manufactured by NEC Electronics, Inc. and which are commercially available under the part number $\mu$PD4516161. It will be apparent, however, that the present invention can be adapted for use with another memory device or devices, such as those produced by other manufacturers. As illustrated in FIGS. 3 and 7, the SDRAM memory device 200 is coupled to the data lines 102A and to the memory control module 118. The memory control module 118 is coupled to the data lines 102A, to the control lines 102B, to the clock CLK signal line 102C, and to the MEMRDY control line 102E.

A command decoder 400 within the memory control module 118 monitors the control lines 102B for commands which require a response on the part of the memory control module 118 and provides commands to the control lines 102B as appropriate. In particular, the command decoder 400 monitors the control lines 102B for the memory read command 01 H (Table 1) and the memory write command 02 H (Table 1). For example, the memory read command 01 H is utilized for retrieving packets from the packet buffers 206 (FIG. 3) and for accessing the look-up tables 204 (FIG. 3) for identifying an appropriate destination port for each packet, whereas, the memory write command 02 H is utilized for storing packets in the packet buffers 206 and for updating the look-up tables 204.

Figure 8:
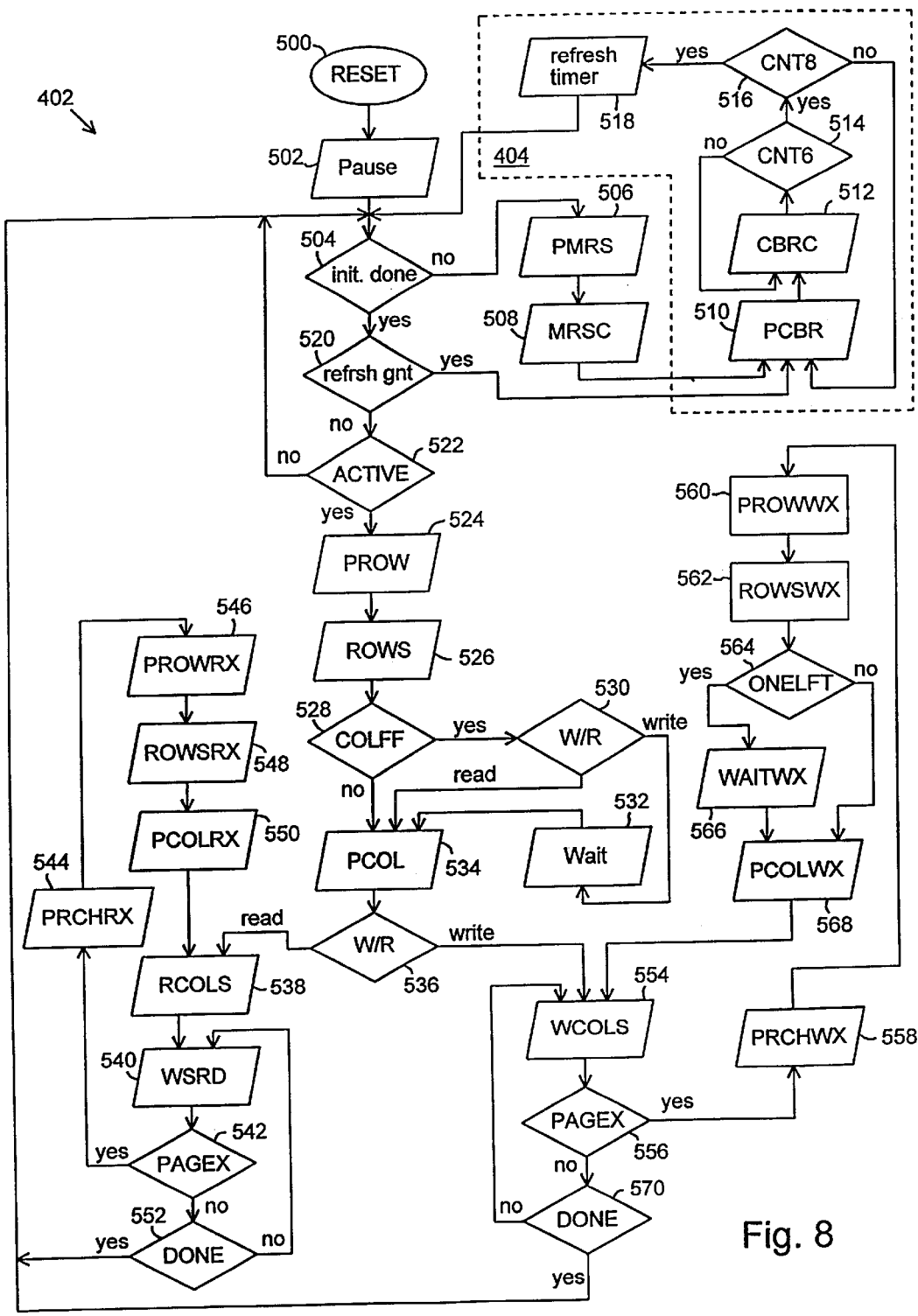
FIG. 8 illustrates a flow diagram of operation of a memory control finite state machine included in the memory control module according to the present invention.

Based upon the commands received from the control lines 102B, the command decoder 400 generates control signals which are provided to a memory control finite state machine (FSM) 402. A flow diagram which illustrates operation of the memory control FSM 402 according to the present invention is illustrated in FIG. 8 and is described in more detail herein.

As illustrated in FIG. 7, among the control signals provided to the memory control FSM 402 by the command decoder 400 are an operation control signal ACTIVE, a write/read control signal W/R and a control signal COLFF. The ACTIVE signal is supplied to the memory control FSM 402 when either the read command 01 H or the write command 02 H is active on the bus 102. The W/R signal notifies the memory control FSM 402 whether an active command is the read command 01 H or the write command 02 H. The COLFF signal informs the memory control FSM 402 that a waiting period, explained herein, may be necessary due to timing considerations for the memory device 200.

The memory control FSM 402 also receives an externally generated reset signal RESET. This signal is generated when the switch engine 100 (FIG. 3) is powered up or reset. As explained herein, the reset signal RESET initiates an initialization sequence in which the memory control FSM 402 initializes the memory device 200 for operation of the switch engine 100.

A refresh FSM 404 is included within the memory control FSM 402. The refresh FSM 404 performs a function of periodically refreshing the memory device 200. Periodic refreshing is needed because, in the preferred embodiment, the memory device 200 includes dynamic memory. According to the requirements of the memory device 200 chosen for the preferred embodiment, each of two 16 M-byte SDRAM memory devices, and thus, the entire memory device 200, must be periodically refreshed within a period of no more than 32 ms. It will be apparent, however, that this time period can vary depending upon the particular requirements of the memory device utilized.

Each of the two 16-M-byte SDRAM devices preferably includes 2K (2048) rows of memory cells which can be refreshed one row at a time. Therefore, the refreshing of each row can be spread evenly over time such that rows are refreshed individually in a sequence, one row every (32÷2048) ms. Alternately, all the rows can be refreshed, one immediately after the other, every 32 ms, thus, grouping all the rows together in one large group for the purpose of refreshing. While the memory device 200 is being refreshed, the memory device 200 cannot generally be accessed for other purposes. Therefore, in the preferred embodiment, the rows are arranged into groups of eight, thus forming 256 groups for each of the two 16-M-byte SDRAM devices included in the memory device 200. The rows of each group are refreshed in a sequence, one immediately after another, however, the refreshing of each group is spread substantially evenly over time. For example, because there are 256 groups of eight, each of the 256 groups must be refreshed each 32 ms. Thus, the groups are refreshed, one group every 125× $10^{-9}$ (32 m÷256) sec. In this way, the memory device 200 is not occupied for refreshing too often (as would occur if refreshing of each row occurred individually and spread evenly over time), nor is the memory device occupied for too long (as would occur if all the rows were refreshed, one after the other, as one large group). In this way, the available bandwidth of the bus 102 for packet handing purposes is minimally impacted by the memory device 200 being unavailable during refresh operations.

In the preferred embodiment, each of the 16 M-byte SDRAM devices included in the memory device 200

"remembers" (keeps track of) which row was last refreshed. Thus, as explained in more detail herein, the memory control FSM 402 is simplified in that it need only initiate refreshing for each row, but does not need to keep track of which rows have been refreshed. It will be apparent, however, the memory control FSM 402 could be configured to also keep track of which rows have been refreshed.

As mentioned, while the memory device 200 is being refreshed, the memory device 200 cannot generally be accessed for other purposes. Therefore, in the preferred embodiment, activity on the bus 102 (FIGS. 3 and 4) is halted during such refresh cycles. When a refresh cycle is required, the refresh FSM 404 generates a refresh request signal via a control signal line 406 which is coupled to the bus control module 114 (FIG. 3). The bus control module 114 then grants the request, according to an appropriate priority, by providing a refresh grant signal to the memory control FSM 402 via a refresh grant control signal line 408. Preferably, the refresh request is granted according to a higher priority than other attempts to gain access to the bus 102. This is to ensure that refresh cycles are performed in a timely fashion according to the requirements of the memory device 200. In addition to illustrating operation of the memory control FSM 402, the flow diagram of FIG. 8 illustrates operation of the refresh FSM 404.

Referring to FIG. 7, a page crossing address generation logic block 410 is also coupled to the memory control FSM 402. In the preferred embodiment, memory cells within the memory device 200 are arranged according to pages. For example, each page can store 256 bytes of data. Recall that data packets are stored in the packet buffers 206 (FIG. 3) of the memory device 200. While a packet is being stored, a page within the packet buffers 206 of the memory device 200 can become full before the entire packet is received. For example, if a packet is longer than 256 bytes, the packet will occupy portions of at least two pages. Thus, a page boundary can be encountered when the packet is being stored in the packet buffers 206 of the memory device 200 and when the packet is being retrieved.

Figure 1:
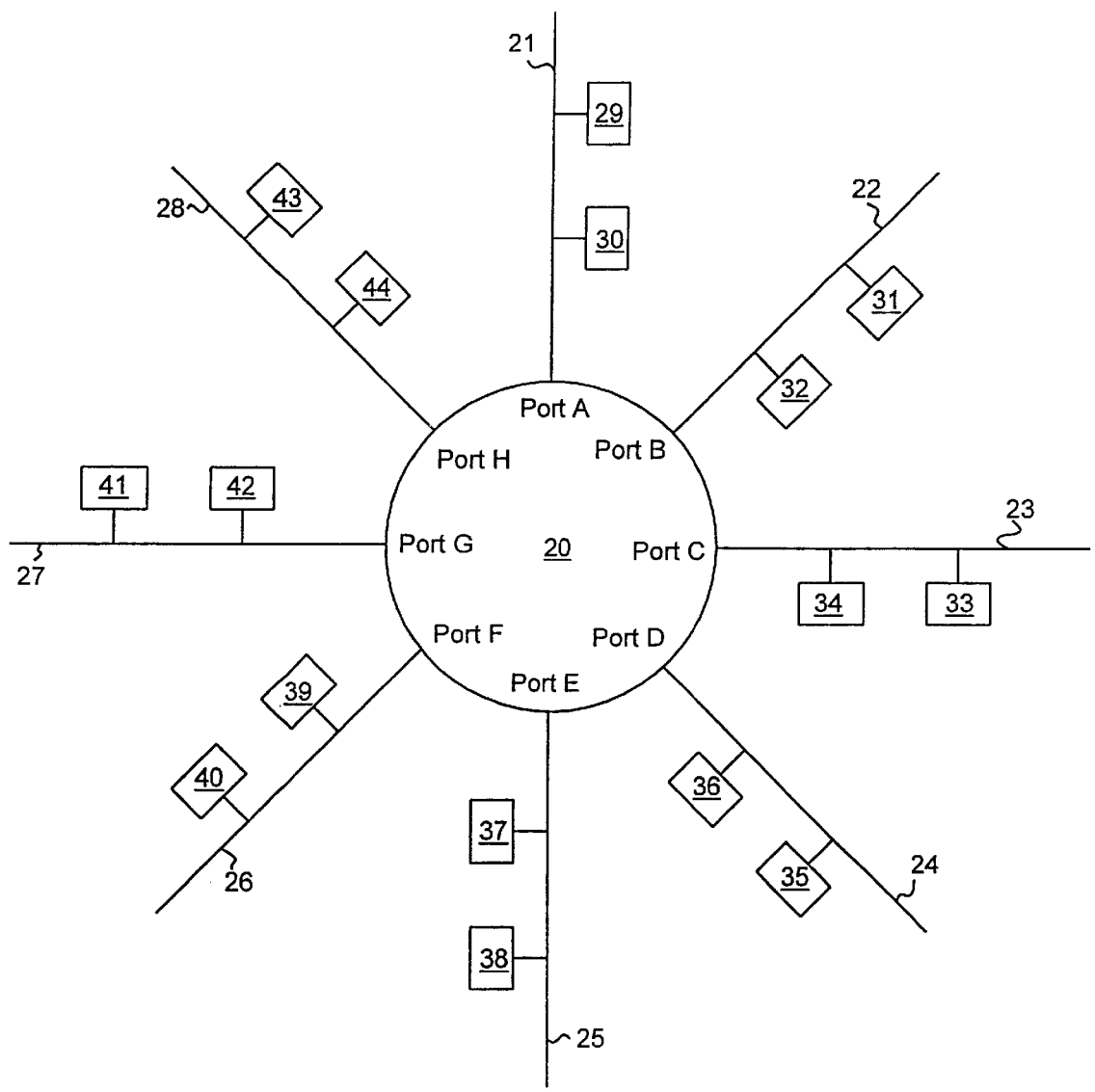
FIG. 1 illustrates a conventional local area network (LAN) including a multi-port bridge.
Figure 2:
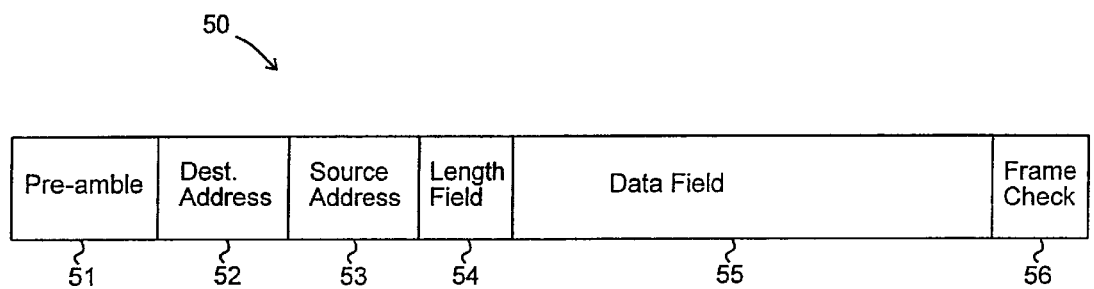
FIG. 2 illustrates a conventional IEEE 802.3 data packet.

In the preferred embodiment, the memory device is configured in burst mode (full page burst mode). Each cycle of a memory clock signal MEM CLK is considered one "data phase." In burst mode, up to 256 bytes (one page) of data can be transferred in successive cycles of the clock signal MEM CLK. Because the length of each data packet 50 (FIG. 2) can vary, multiple bursts may be required for a packet. When a page crossing occurs prior to the end of a packet, the current burst ends and a new one begins on a next page within the memory device 200. The last burst for a packet, however, generally needs to be stopped at the end of the packet. For this reason, the page crossing address generation logic block 410 preferably keeps track of a current byte count for each packet, a total length of the packet and page boundaries. When the current byte count is equal to the total length of the packet or is about to reach a page boundary, the burst is stopped.

The page address generation logic block 410 and an address registers block 412 each receive indica for each packet from the command decoder 400. This indicia identifies a location in the memory device 200 from which a memory read command 01 H is to be performed or a location in the memory device to which a memory write command 02 H is to be performed. These locations are obtained by the command decoder 400 from the data lines 102A and are identified in the address field of the memory read command 01 H and in the address field of the memory write command 02 H (See Table 1).

In addition, the indicia provided for each packet by the command decoder 400 to the page crossing address generation logic 410 identifies a number of transfers to be performed during a memory read or a memory write operation. This number of transfers information is obtained from the data lines 102A and is contained in the number of transfers field for the memory read command 01 H and memory write command 02 H (See Table 1).

Based upon the indicia provided by the command decoder 400, the page crossing address generation logic 410 provides control signals to the memory control FSM 402 and to the address registers 412. Among the control signals provided to the memory control FSM 402 are a control signal ONELEFT, a control signal PAGEX and a control signal DONE. The ONELEFT signal notifies the memory control FSM 402 that one byte remains before the end of a packet is reached. The PAGEX signal notifies the memory control FSM 402 of a page crossing. The DONE signal notifies the memory control FSM 402 of the end of a packet.

In addition, an address signal PGXADD is provided to the address registers 412 by the page crossing address generation logic 410. The PGXADD signal identifies a first available location, preferably by its memory address, within the memory device 200 on a next page within the memory device 200. The address registers 412 store this page crossing address obtained from the page crossing address generation logic 410 and also store the memory address obtained from the command decoder 400. The addresses stored in the address registers 412 are provided to an address multiplexer 414.

Based upon its input signals, the memory control FSM 402 moves from state-to-state according to the flow diagram illustrated in FIG. 8, as explained in more detail herein. An output of the memory control FSM 402 is a 4-bit signal indicative of the current state of the memory control FSM 402 (and of the refresh FSM 404). This current state information is provided to an output signals logic block 416.

The output signals logic block 416 generates control signals based upon the current state of the memory control FSM 402 (including the refresh FSM 404) and in accordance with the requirements of the memory device 200. Among these control signals are the clock signal MEM CLK, a chip select (CS) signal, a row address strobe (RAS) signal, a column address strobe (CAS) signal, a write enable (WE) signal, an upper DQ mask enable (UDQM) signal and a lower DQ mask enable (LDQM) signal. Note that in an alternate embodiment, the output signals logic block 416 is included in the memory control FSM 402. In which case, the memory control FSM 402 forms the control signals MEM CLK, CS, RAS, CAS, WE, UDQM and LDQM.

The MEM CLK signal is the master clock input to the memory device 200 and is derived from the bus clock signal on the clock CLK line 102C (FIG. 4). Other inputs to the memory device 200 are accepted by the memory device 200 upon the rising edges of the MEM CLK signal. The chip select signal CS starts a memory control input cycle; when this signal is a logic high voltage, inputs to the memory device 200 are ignored by the memory device 200, though previously initiated memory operations continue. Combinations of the chip select signal (CS), the row address strobe (RAS) signal, the column address strobe (CAS) signal and the write enable (WE) signal control the memory device 200 to perform various operations, as described herein. The upper DQ mask enable (UDQM) signal and the lower DQ mask enable (LDQM) signals turn off and on upper and lower bytes of data-port buffers 418 within the memory device 200. These data-port buffers 418 are coupled to the data lines 102A, and selectively allow the transfer of data between the memory device 200 and the data lines 102A. In addition, the memory device 200 includes a mode register 420 for storing operational parameters for the memory device 200.

The output signals logic block 416 controls the address multiplexer 414 via a control signal SELXADD and a control signal SELADD. These signals select either: (a) an address assigned to a packet when a packet begins to be stored in the memory device 200 and when a packet begins to be retrieved from the memory device 200, or (b) a first available location on a next page within the memory device 200 in the event a page crossing occurs while storing or retrieving a packet. The SELADD signal includes two signal lines, one for selecting a row address within the memory device 200 and the other for selecting a column address within the memory device 200. An output of the address multiplexer 414 is coupled to an address port 422 of the memory device 200 for providing an appropriate address to the memory device 200.

Upon completion of a memory read or write operation, the output signals logic block 416 generates the memory ready signal on the MEMRDY line 102E.

Referring to FIG. 8 (and to FIG. 7), upon receiving the reset signal RESET, the memory control FSM 402 moves from a reset state 500 to a pause state 502. In the pause state 502, the memory control FSM 402 pauses for period of time which allows circuits internal to the memory device 200 to stabilize before control signals are applied to the memory device 200. The memory control FSM 402 then moves from the pause state 502 to a state 504 where a determination is made whether the memory device 200 has been initialized since a most recent reset or power-on.

Assuming the memory device 200 has not yet been initialized, the memory control FSM 402 moves from the state 504 to a state 506. In the state 506, the memory device 200 is precharged. Once precharging is complete, the CS, RAS, CAS and WE signals are configured for setting the mode register 420 (Pre-Mode Register Set). Upon the leading edge of a next pulse of the MEM CLK signal, the memory control FSM 402 moves to a state 508 where appropriate operational parameters are stored in the mode register 420 (Mode Register Set Command). In the preferred embodiment, the mode register 420 is configured for full-page burst mode and for a latency of two. It will be apparent, however, than other operational parameters can be selected.

Upon initialization, the memory device 200 requires that at least two rows be refreshed before subsequent operations can be performed. As mentioned, in the preferred embodiment, rows within the memory device 200 are refreshed in groups of eight. Therefore, to simplify implementation of the memory control FSM 402, eight rows are refreshed upon initialization of the memory device 200 to satisfy the requirement that at least two rows be refreshed. It will be apparent that the memory control FSM 402 can alternately be configured to refresh a different number of rows upon initialization of the memory device 200.

Accordingly, upon setting the mode register 420 in the state 508, the memory control FSM 402 moves to a state 510 where operation of the refresh FSM 404 begins. In the state 510, the CS, RAS, CAS and WE signals supplied to the memory device 200 are appropriately configured for a refresh operation. In the preferred embodiment, the refresh operation is a CAS before RAS refresh. Thus, the operation performed in the state 510 is a pre-CAS before RAS refresh (PCBR). Upon the leading edge of a next pulse of the MEM CLK signal, the inputs to the memory device 200 are sampled and the memory control FSM 402 moves to a state 512. In the state 512, the CAS before RAS refresh operation for a single row is initiated.

Due to timing considerations, the memory device 200 cannot accept a next refresh cycle until a time period equivalent to six clock pulses of the MEM CLK signal has elapsed. Accordingly, it will be apparent the number of clock pulses will generally depend upon a particular frequency selected for the MEM CLK signal. Therefore, the memory control FSM 402 maintains the CAS before RAS Command for six clock cycles by cycling through the states 512 and 514. For each cycle, a first count maintained by the output signals logic block 416 is increased by one. Upon the first count reaching six, the output signals logic block 416 notifies the memory control FSM via a control signal CNT6. Then, the first count is set to zero and the memory control FSM 402 moves to a state 516.

Because, in the preferred embodiment, each refresh cycle refreshes a group of eight rows within the memory device 200, one after another, the refresh operation is immediately repeated for each of the eight rows of each group. Therefore, in the state 516, a second count maintained by the output signals logic block 416 is incremented by one. Then, memory control FSM 402 cycles through the states 510, 512, 514, thereby initiating a CAS before RAS Command for refreshing each of the eight rows. For each cycle, the second count is increased by one. Note that for each of the eight rows, the first count reaches six before proceeding to the next row.

Upon the second count reaching eight, the output signals logic block 416 notifies the memory control FSM via a control signal CNT8. Then, the second count is set to zero and the memory control FSM 402 moves from the state 516 to a state 518.

In the state 518, a refresh timer is started. The refresh timer is preferably implemented as a counter which increments according the MEM CLK signal. The refresh timer periodically asserts the refresh request signal via the signal line 406 (so that the bus control module 114 will grant the request via the signal line 408) according to the refresh requirements of the memory device 200. From the state 518, the memory control FSM 402 returns the to a state 504. Notes that the states 510, 512, 514, 516 and 518 are implemented by the refresh FSM 404.

Accordingly, initialization of the memory device 200 is performed by the memory control FSM 402 moving through the states 502, 504, 506, 508 and through the refresh FSM 404 a first time. Assuming that in the state 504, it is determined that initialization of the memory device 200 has been completed, the memory control FSM 402 moves from the state 504 to the state 520.

In the state 520, a determination is made whether the refresh grant signal has been activated by the bus control module 114 (FIG. 3) in response to a refresh request signal asserted by the timer initiated in the state 518. Assuming the refresh grant signal is active, then the memory control FSM 402 moves from the state 520 to the state 510. A next eight rows of the memory device 200 are then refreshed by the refresh FSM 404, as described above.

Assuming that in the state 520, the refresh grant signal is not active, the memory control FSM 402 moves to a state 522. In the state 522, a determination is made whether the control signal ACTIVE formed by the command decoder 400 is active. Recall that the ACTIVE signal is supplied to the memory control FSM 402 when either the read command 01 H or the write command 02 H is active on the bus 102. Assuming that neither the read command 01 H, nor the write command 02 H is active, then the memory control FSM 402 moves from the state 522 to the state 504. In such case, the memory control FSM 402 is in an idle mode where the memory control FSM 402 cycles through the states 504, 520 and 522 until either a refresh request is granted or the ACTIVE signal is asserted. When the refresh grant signal is asserted, a next group of eight rows in the memory device 200 is refreshed before the memory control FSM 504 returns to the idle mode.

Assuming that in the state 522, it is determined that the ACTIVE signal is asserted, the memory control FSM 402 moves to a state 524. In the state 524, the control signals CS, RAS, CAS and WE are conditioned for activating a selected row within the memory device 200. In addition, the appropriate row address is provided to the memory device 200 by the address multiplexer 414. Then, upon a next leading edge of the MEM CLK signal, the control inputs to the memory device 200 are sampled and the memory control FSM 402 moves to a state 526. In the state 526 the selected row is activated.

Whether the active command is a read command 01 H or a write command 02 H, an appropriate row needs to be selected. For this reason, in the preferred embodiment, the states 524 and 526 are utilized for both types of operations and a determination as to whether the active command is a read command 01 H or a write command 02 H is not made by the memory control FSM 402 until after the appropriate row is activated. Note that the appropriate row for either operation is activated, however, because the memory address which identifies the appropriate row is obtained from the data lines 102A by the command decoder 200 and is provided to the address registers 412. This address is then supplied to the memory device 200 via the address multiplexer 414.

From the state 526, the memory control FSM 402 moves to a state 528 where a determination is made as to whether the COLFF control signal is active. Assuming the control signal COLFF is active, the memory control FSM 402 moves to a state 530. In the state 530, a determination is made as to whether the W/R control signal indicates that an active command is a memory read command 01 H or a memory write command 02 H. Assuming the write command 01 H is active, the memory control FSM 402 moves from the state 530 to a state 532. Thus, for the memory control FSM 402 to reach the state 532, the COLFF control signal is active and the W/R control signal indicates that the write command 02 H is active. In which case, the memory FSM 402 pauses for a period time to account for timing requirements of the two 16 M-byte SDRAM memory devices included in the memory device 200. For certain memory operations, only a few bytes are data are written to the memory device 200 at a time. For example, this occurs when the look-up tables 204 (FIG. 3) are updated by the look-up control module 120 (FIG. 3). In such case, because the memory device 200 is preferably configured in burst mode, the wait state 532 is preferably included as a precaution taken to ensure that the burst is stopped before additional locations of the memory device 200 are written to. Otherwise, the write operation could erroneously overwrite critical data stored in the memory device 200.

Assuming that in the state 528, the COLFF control signal is not active, or assuming that in the state 530, the W/R control signal indicates that the read command 01 H is active, the memory control FSM 402 moves to the state 534.

In the state 534, the control signals CS, RAS and CAS are configured for activating a selected column within the memory device, 200 for either a read or write operation (the control signal WE is preferably not yet configured). In addition, the appropriate column address is provided to the memory device 200 by the address multiplexer 414. Then, the memory control FSM 402 moves to a state 536.

In the state 536, a determination is finally made as to whether the W/R control signal indicates that an active command is a memory read command 01 H or a memory write command 02 H and, based thereupon, the level of the WE control signal is appropriately configured. Upon a next leading edge of the MEM CLK signal, and assuming the read command 01 H is active, the control signals CS, CAS, RAS and WE are sampled by the memory device 200 and the memory control FSM 402 moves from the state 536 to a state 538. In the state 538, a memory read operation is initiated. The specified data, however, is not expected to appear at the data outputs of the memory device 200 until one cycle of the clock signal MEM CLK has elapsed. Therefore, the memory control FSM 402 moves from the state 538 to a state 540. In the state 540, the memory control FSM 402 waits for one cycle of MEM CLK to elapse and, then, moves to a state 542.

In the state 542, a first two bytes of the specified data is expected to be available. Therefore, the output buffers 418 are enabled, thereby applying the specified data to the data lines 102A. In addition, the MEM RDY control line 102E is pulsed to notify a recipient of the data that the data is available on the data lines 102A. Also in the state 542, a determination is made as to whether a next two bytes of data are to be read from the current page or, in the event that a page crossing is encountered, if the next two bytes are to be read from a next page. A page crossing is signified by a level of the PAGEX control signal. If page crossing is encountered, the memory control FSM 402 moves from the state 542 to a state 544.

In the state 544, the control signals CS, CAS, RAS and WE are configured for a pre-charge command. Upon a next leading edge of the clock signal, the pre-charge command is sampled by the memory device 200 and the memory control FSM 402 moves to a state 546. The pre-charge command has the effect of stopping the read operation. Otherwise, because the memory device 200 is configured in the burst mode, data would continue to be read from the memory device 200 starting with the first location on the same page as the previous data, thus, wrapping around on the same page. Therefore, because the required data is stored on a next page, the read operation is stopped by the precharge command. Alternately, it will be apparent that, instead of the pre-charge command, a burst stop command could be utilized to stop the read operation.

In the state 546, the control signals CS, RAS, CAS and WE are conditioned for activating a selected row within the memory device 200. In addition, the appropriate row address is provided to the memory device 200 by the address multiplexer 414. Then, upon are next leading edge of the MEM CLK signal, the control inputs to the memory device 200 are sampled and the memory control FSM 402 moves to a state 548.

In the state 548, the selected row is activated and, then, the memory control FSM 402 moves to a state 550. In the state 550, the control signals CS, RAS, CAS and WE are conditioned for activating a selected column within the memory device 200 for a next read operation. In addition, the appropriate column address is provided to the memory device 200 by the address multiplexer 414. Upon a next leading edge of the MEM CLK signal, the control signals CS, RAS, CAS and WE are sampled by the memory device 200 and the memory control FSM 402 moves from the state 550, to the state 538, and to the state 540, as described above.

Assuming that in the state 542, it is determined that a page crossing is not encountered such that a next two bytes of data are to be read from the current page, the memory control FSM 402 moves to a state 552. In the state 552, a determination is made as to whether the read operation is complete as indicated by the DONE signal. For example, the read operation is complete when an entire packet has been completely retrieved from the memory device 200.

If the read operation is not complete, the memory control FSM 402 returns to the state 540. This process of cycling between the states 540, 542 and 552 continues until a page crossing is encountered or the read operation is complete. When the read operation is determined to be complete in the state 552, the memory control FSM 402 returns to the state 504.

Alternately, assume that in the state 536, it is determined that the active command is a write command 02 H. In which case, the level of the WE control signal is adjusted for a write operation and the appropriate data to be written into the memory device 200 is placed on the data lines 102A and the buffers 418 are configured for accepting the data. Then, upon a next leading edge of the clock signal MEM CLK, the control inputs to the memory device 200 are sampled and the memory control FSM 402 moves from the state 536 to a state 554. In the state 554, the selected column is activated and the data is written into the specified memory location. Then, the memory control FSM 402 moves from the state 554 to a state 556.

In the state 556, a determination is made as to whether a next two bytes of data are to be written to a next location on the current page or, in the event that a page crossing is encountered, if the next two bytes are to be written to a next page. A page crossing is signified by a level of the PAGEX control signal. If page crossing is encountered, the memory control FSM 402 moves from the state 556 to a state 558.

In the state 558, the CS, RAS, CAS and WE control signals are configured for a pre-charge command. Upon a next leading edge of the clock signal, the pre-charge command is sampled by the memory device 200 and the memory control FSM 402 moves to a state 560. The pre-charge command has the effect of stopping the write operation. Otherwise, because the memory device 200 is configured in the burst mode, data would continue to be written to the memory device 200 starting with the first location on the same page as the previous data, thus, wrapping around on the same page and possibly overwriting critical data. Alternately, it will be apparent that, instead of the pre-charge command, a burst stop command could be utilized to stop the write operation.

In the state 560, the control signals CS, RAS, CAS and WE are conditioned for activating a selected row within the memory device 200. In addition, the appropriate row address is provided to the memory device 200 by the address multiplexer 414. Then, upon a next leading edge of the MEM CLK signal, the control inputs to the memory device 200 are sampled and the memory control FSM 402 moves to a state 562. In the state 562, the appropriate row in the memory device is activated. Then, the memory control FSM 402 moves to a state 564.

In the state 564, a determination is made as to whether the ONELEFT signal is active. Recall that the ONELEFT signal notifies the memory control FSM 402 that one byte remains before the end of a packet is reached. Assuming the ONELEFT signal is active, wait period is require to ensure that the burst can be stopped after the next write cycle and that no additional write cycles are performed, possibly overwriting critical data. Thus, the memory control FSM 402 moves from the state 564 to a state 566. In the state 566, the memory control FSM 402 waits an appropriate amount of time before proceeding to a state 568.

Alternately, if the ONELEFT control signal is not active, the memory control FSM 402 proceeds directly from the state 564 to the state 568.

In the state 568, the control signals CS, RAS, CAS and WE are conditioned for activating a selected column within the memory device 200 for a next write operation. In addition, the appropriate column address is provided to the memory device 200 by the address multiplexer 414 and the appropriate data is supplied to the memory device 200 via the date lines 102A and buffers 418. Upon a next leading edge of the MEM CLK signal, the control signals CS, RAS, CAS and WE are sampled by the memory device 200 and the memory control FSM 402 moves from the state 568, to the state 554. Operation continues from the state 554, as described above.

Alternately, assume that in the state 556, it is determined that a page crossing is not encountered. In which case, a next two bytes of data are to be written to the current page. Therefore, the memory control FSM 402 moves from the state 556 to a state 570. In the state 570, a determination is made as to whether the write operation is complete as indicated by the DONE signal. For example, the write operation is complete when an entire packet has been completely written into the packet buffers 206 (FIG. 3) of the memory device 200.

If the write operation is not complete, the memory control FSM 402 returns to the state 554. This process of cycling between the states 554, 556 and 570 continues until a page crossing is encountered or the write operation is complete. When the write operation is determined to be complete in the state 570, the memory control FSM 402 returns to the state, 504 from the state 570.

Figure 9:
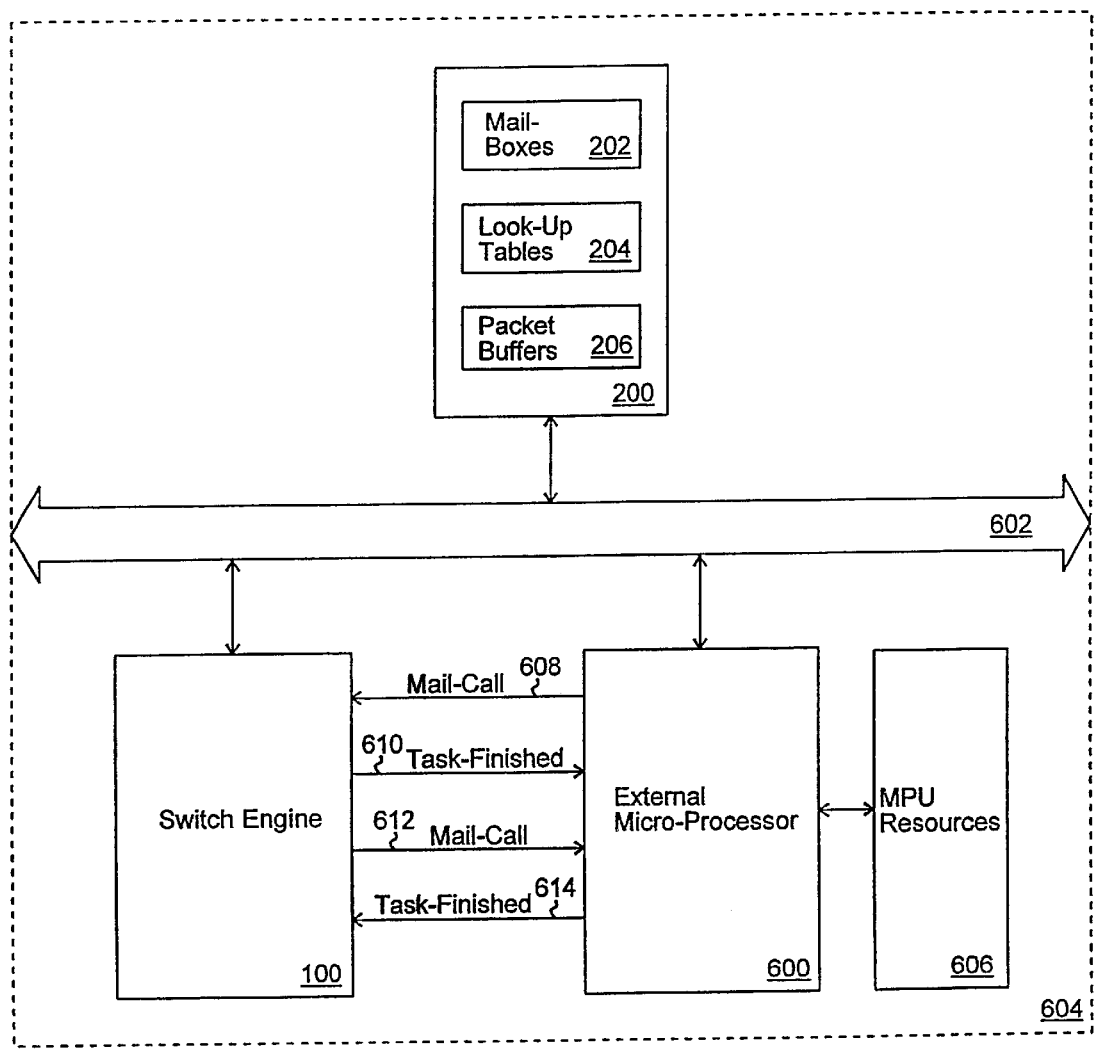
FIG. 9 illustrates a block schematic diagram of the switch engine, a memory device and an external processor according to the present invention.

FIG. 9 illustrates a block schematic diagram of the switch engine 100, the memory device 200 and an external processor 600 according to the present invention. A memory bus 602 interconnects the switch engine 100 and the external processor 600 to the memory device 200. Preferably, access to the memory device 200 by the switch engine 100 and the external processor 600 is implemented by a multiplexer included as part of the memory bus 602 and which multiplexer is controlled by the switch engine 100. The switch engine 100, including the communication bus 102 (FIG. 3), is preferably implemented as an integrated circuit mounted to a printed circuit board 604. The memory device 200 and the external processor 600 are also mounted to the printed circuit board 604.

As described above in reference to FIGS. 3–6, the bridging and filtering functions of the multi-port bridge are performed primarily by the switch engine 100 and the buffer memory 200. Because the switch engine 100 is preferably implemented as a number of finite state machines interconnected via the communication bus 102, the switch engine 100 provides a high bandwidth capacity for directing data packets through the multi-port bridge. Thus, according to the present invention, the external processor 600 is provided to perform tasks in support of the functioning of the switch engine 100. These functions include: providing a communication port for enabling the nodes of the LAN to communicate with nodes of a dissimilar LAN or a WAN and for enabling the nodes of the LAN to communicate with a file server for the LAN; providing parameters for initializing registers of the switch engine via a register load command 0C (Table 1); collecting data from the LAN for performing network management functions via a register read command 0D (Table 1); and providing services to the switch engine 100. The mailbox interface according to the present invention allows the external processor 600 to provide these functions without the need to dedicate a large number of pins of the integrated circuit package to such an interface.

Preferably, the external processor 600 is implemented as a reduced instruction set computer (RISC) to improve speed performance. The external processor 600 can have its own dedicated resources 606, such as memory for storing operating software for the external processor 600 and for use by the external processor 600 as a scratch pad. In addition, when the external processor 600 performs the functions of a file server for the LAN, the resources 606 can include a mass storage device for storing application programs and data files which is accessible by the external processor 600. Also, when the external processor 600 performs the function of providing an interconnection of the LAN to a dissimilar LAN or to a WAN, the resources 606 can include a communication device, such as a telephone modem, an integrated services digital network (ISDN) interface, a T1 media interface or a T3 media interface which is accessible by the external processor 600. In addition, multiple external processors 600 can be coupled to the memory bus 602. In such case, additional resources can be provided for such multiple external processors, such as one or more mass storage devices and/or one or more communication devices.

When a packet is originated by the external processor 600, the destination address and source address for the packet are placed in the memory 200 by the external processor 600. Thus, rather than obtaining the destination and source addresses from the source port, the destination and source addresses are obtained from the memory 200. The memory control module 118 places a look-up gated with MEMRDY command 09 H on the control lines 102B of the bus 102, retrieves the destination address and source address from the memory 200, and places them on the data lines 102A. As with the look-up command 03 H, transfer of the destination and source addresses is performed over several bus clock cycles. The look-up control module 120 responds to the look-up gated with MEMRDY command 09 H by waiting until the MEMRDY line 102E is raised to a logic high voltage level before beginning to receive the destination and source addresses for performing a look-up cycle. This ensures that the destination and source addresses appearing on the data lines 102A are valid before the look-up control module 120 receives them.

Figure 10:
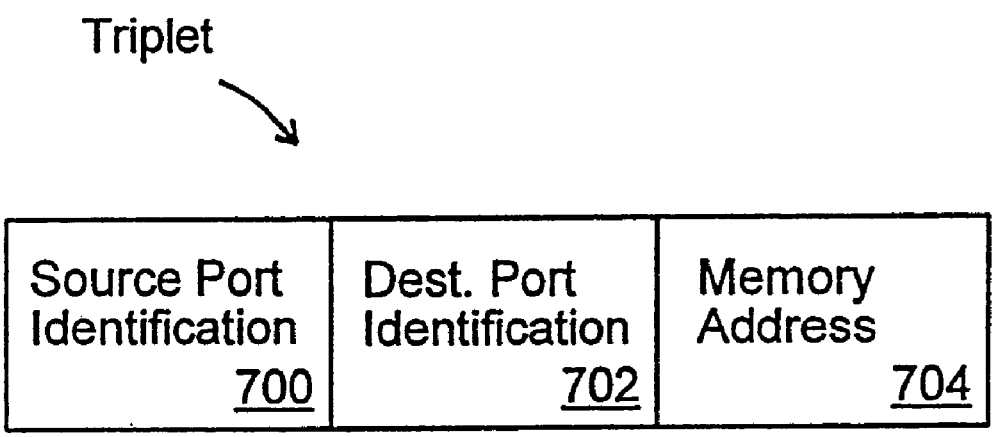
FIG. 10 illustrates a "triplet" according to the present invention, including a first field containing an identification of a source port, a second field containing an identification of a destination port, and a third field containing a memory address.

In an alternate embodiment, the memory pointer buffer 306 (FIG. 5) of each port stores memory pointers, referred to as "triplets" for data packets being queued in the packet buffers 206 (FIG. 3) of the DRAM memory 200, rather than the memory pointers described above (having a packet identification number and memory starting address). FIG. 10 illustrates a "triplet" according to the present invention. Each triplet includes three fields: a first field 700 containing the identification of the source port, a second field 702 containing the identification of the destination port, and a third field 704 containing a starting address assigned to the incoming packet in the packet buffers 206.

As before, while a packet is being received by the source port, a look-up cycle is initiated by the source port to identify the appropriate destination port for the packet based upon the destination address. A result of performing the look-up for each packet, however, is a triplet. The starting address contained in the triplet is assigned by the memory control module 118. While the packet is being received by the source port, the memory control module 118 places an "initial" triplet on the data lines 102A of the communication bus 102 and places a corresponding initial triplet command on the control lines 102B. This is in contrast to placing the bit-map of the destination ports on the data lines 102A and placing the associated the look-up ready command 08 H on the control lines 102B, as described above. The initial triplet is received by each port. If the source port and the destination port are the same, this indicates that the source and destination nodes are on the same segment of the LAN (intra-segment communication). The source port recognizes this condition and, in response, filters the packet.

If the port identified as the destination port in the triplet is not currently busy transmitting or receiving another packet, the destination port configures itself to receive the packet directly from the source port (cut-through). However, if the memory pointer buffer 306 in the port identified as the destination port in the triplet is nearly full, the bus controller 300 of the destination port raises the JAM REQ line 102D. The source port receives the jam request and, in response, discards the incoming packet and also sends a jam signal over its associated segment. The jam signal causes the node (source node) which is the source of the packet to discontinue sending the packet and attempt to resend the packet after a waiting period.

The packet is loaded from the receive buffer 316 (FIG. 5) of the source port into the packet buffers 206 starting at the memory address identified by the third field of the triplet. As before, a predetermined offset provides a space for storing header information for the packet. Writing of the packet into the packet buffers 206 preferably occurs as the remainder of the packet is still being received into the receive buffer of the source port. For this reason, the receive buffer 316 for each port need not be capable of storing the entire data packet. In addition, if the destination port is configured for cut-through, the destination port will receive the packet into its transmit buffer 318 (FIG. 5) directly from the communication bus 102 simultaneously with the write cycles for loading of the packet into the packet buffers 206.

During such a cut-through operation, the packet is received into the transmit buffer 318 of the destination port and immediately transmitted to the LAN segment associated with the destination port.

Once the entire packet has been loaded into the packet buffers 206, the memory control module 118 places a "final" triplet on the data lines 102A of the communication bus 102 and places a corresponding final triplet command on the control lines 102B. It should be noted that the bit patterns for the initial triplet and for the final triplet are preferably identical, while the bit patterns placed on the command lines of the communication bus 102 for identifying each of the initial and final triplets are distinct. The destination port receives the final triplet and stores it in its memory pointer buffer 306. This is in contrast to placing the packet identification and assigned starting address in the memory pointer buffer, as described above. Thus, the packet is queued for transmission by the destination port.

Then, when the destination port is no longer busy, the destination port retrieves the packet from the packet buffers 206 by gaining access to the communication bus 102 and initiates a series of read operations over the communication bus 102 beginning at the starting address in the packet buffers 206 of the packet (from the third field of the triplet for the packet).

In both embodiments, the memory pointers stored in the memory pointer buffer 306 of each port are preferably of a uniform size. Therefore, the exact number of memory pointers that can be accommodated by a memory pointer buffer 306 of a port can be determined from the amount of space available in the memory pointer buffer 306 of the port. Accordingly, unlike prior arrangements, extra space does need to be provided in the port to accommodate a data packet having an unknown length. According to the present invention, however, the jam request (raising the JAM REQ line) is preferably generated by a destination port for a packet when the memory pointer buffer 306 in the port is nearly full, but has space available to store several memory pointers (e.g. ten). This provides the destination port an ability to store memory pointers for packets which are in the process of being loaded into the packet buffers 206. The memory pointer buffer 306 in each port is preferably sized relative to the associated packet buffers 206 in the memory device 200 such that there is only a small possibility that the packet buffers 206 will become full before any memory pointer buffer 306 becomes full. For example, because each port can hold up to 128 memory pointers, the packet buffers 206 can preferably accommodate 128 data packets of the maximum size for each port. In practice, the packet buffers 206 can be somewhat smaller because not every packet is expected to have the maximum size.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A memory controller for providing an interface between a memory device and a communication bus in a multi-port bridge for a local area network wherein the communication bus interconnects a plurality of ports of the multi-port bridge, the memory controller comprising:
   a. a command decoder coupled to the communication bus for receiving bus commands from the communication bus and for forming an operation control signal indicative of a type of bus command received;
   b. a memory control finite state machine coupled to receive the operation control signal from the command decoder, the memory control finite state machine having a plurality of states;
   c. means for forming a plurality of memory control signals according to a current state of the memory control finite state machine wherein the memory control signals are coupled to control inputs of the memory device; and
   d. means for forming row and column addresses according to memory address data received from the communication bus, the row and column addresses for coupling to address inputs of the memory device.

2. The memory controller according to claim 1 wherein the communication bus includes control signal lines and data lines and wherein the command decoder is coupled to the control lines and the means for forming row and column address is coupled to the data lines.

3. The memory controller according to claim 1 wherein the means for forming a plurality of memory control signals is a logic circuit coupled to the memory control finite state machine.

4. The memory controller according to claim 1 wherein the means forming a plurality of memory control signals is included in the memory control finite state machine.

5. The memory controller according to claim 1 further comprising a memory device coupled to the memory controller wherein the memory device is utilized for storing data packets to be bridged by the multi-port bridge.

6. The memory controller according to claim 5 wherein the memory control finite state machine includes a refresh finite state machine for periodically refreshing the memory device.

7. The memory controller according to claim 6 wherein a total number of rows of the memory device are arranged in groups of a predetermined number of rows and wherein the refresh finite state machine is configured for refreshing each group in sequence, spread substantially evenly over a predetermined period of time, and wherein each row in each group is refreshed, one after the other.

8. The memory controller according to claim 7 wherein the predetermined number of rows is eight.

9. The memory controller according to claim 8 wherein the total number of rows is 2048.

10. The memory controller according to claim 9 wherein the predetermined period of time is 32 ms.

11. The memory controller according to claim 6 wherein activity on the communication bus is halted while rows of the memory device are being refreshed.

12. The memory controller according to claim 11 wherein the refresh finite state machine initiates a refresh operation by activating a refresh request signal line and waiting until a refresh grant signal line is activated by a bus controller coupled to the communication bus.

13. The memory controller according to claim 1 wherein the memory control finite state machine comprises:
   a. a plurality of states for initiating a read operation;
   b. a plurality of states for initiating a write operation; and
   c. a state for determining whether an active operation is a read operation or a write operation.

14. The memory controller according to claim 13 wherein the finite state machine further comprises a plurality of states for periodically refreshing the memory device.

15. The memory controller according to claim 13 wherein the finite state machine further comprises a state for initiating a read or a write operation and wherein the state for initiating a read or a write operation occurs prior to the a state for determining whether an active operation is a read or a write operation.

16. The memory controller according to claim 13 wherein a selected row in the memory device is activated in the state for initiating a read or a write operation.

17. The memory controller according to claim 16 wherein each read operation includes a selected number of memory transfers.

18. The memory controller according to claim 17 wherein each read operation is performed while the memory device is configured in burst mode.

19. The memory controller according to claim 18 wherein the memory device is arranged according to pages and wherein when a read operation encounters a page crossing, the read operation is halted by appropriately conditioning the memory control signals.

20. The memory controller according to claim 16 wherein each write operation includes a selected number of memory transfers.

21. The memory controller according to claim 20 wherein each write operation its performed while the memory device is configured in burst mode.

22. The memory controller according to claim 21 wherein the memory device is arranged according to pages and wherein when a write operation encounters a page crossing, the read operation is halted by appropriately conditioning the memory control signals.

23. A memory controller for providing an interface between a memory device and a communication bus in a multi-port bridge for a local area network wherein the communication bus interconnects a plurality of ports of the multi-port bridge, the memory controller comprising:

a. a command decoder coupled to the communication bus for receiving bus commands from the communication bus and for forming a control signal indicative of a type of bus command received;

b. a memory control finite state machine coupled to receive the control signal indicative of a type of bus command received from the command decoder, the memory control finite state machine having a plurality of states wherein the memory control finite state machine includes a refresh finite state machine for refreshing the memory device wherein the refresh finite state machine periodically initiates a refresh operation by requesting a halt of activity on the communication bus.

24. The memory controller according to claim 23 wherein activity on the communication bus is halted while rows of the memory device are being refreshed.

25. The memory controller according to claim 24 wherein after requesting a halt of activity on the communication bus, the refresh finite state machine waits until a refresh grant signal line is activated by a bus controller coupled to the communication bus before refreshing a selected portion of the memory device.

26. The memory controller according to claim 23 wherein the wherein a total number of rows of the memory device are arranged in groups of a predetermined number of rows and wherein the refresh finite state machine is configured for refreshing each group in sequence, spread substantially evenly over a predetermined period of time, and wherein each row in each group is refreshed, one after the other.

27. The memory controller according to claim 26 wherein the predetermined number of rows is eight.

28. The memory controller according to claim 27 wherein the total number of rows is 2048.

* * * * *

UNITED STATES PATENT AND TRADEMARK OFFICE
CERTIFICATE OF CORRECTION

PATENT NO.     : 6,446,173 B1
DATED          : September 3, 2002
INVENTOR(S)    : Son Minh Pham It is certified that error appears in the above-identified patent and that said Letters Patent is hereby corrected as shown below:

Title page,
Item [56], References Cited, insert the following:

| | | | |
|---|---|---|---|
| -- U.S. Patent No. 5,608,879 | 03/04/1997 | Cooke | 395/290 |
| U.S. Patent No. 5,608,730 | 03/04/1997 | Osakabe et al. | 370/471 |
| U.S. Patent No. 5,598,391 | 01/28/1997 | Mukawa | 369/54 |
| U.S. Patent No. 5,598,278 | 01/28/1997 | Tanaka et al | 386/96 |
| U.S. Patent No. 5,568,476 | 10/22/1996 | Sherer et al. | 370/60 |
| U.S. Patent No. 5,560,038 | 09/24/1996 | Haddock | 395/800 |
| U.S. Patent No. 5,550,826 | 08/27/1996 | Tanaka et al. | 370/85.8 |
| U.S. Patent No. 5,541,923 | 07/30/1996 | Kato | 370/85.1 |
| U.S. Patent No. 5,530,434 | 06/25/1996 | Kanda | 340/825.04 |
| U.S. Patent No. 5,521,913 | 05/28/1996 | Gridley | 310/58.2 |
| U.S. Patent No. 5,506,902 | 04/09/1996 | Kubota | 380/9 |
| U.S. Patent No. 5,502,748 | 03/26/1996 | Wilkinson | 375/354 |
| U.S. Patent No. 5,487,067 | 01/23/1996 | Matsushige | 370/85.7 |
| U.S. Patent No. 5,457,679 | 10/10/1995 | Eng et al. | 370/16 |
| U.S. Patent No. 5,457,446 | 10/10/1995 | Yamamoto | 340/825.24 |
| U.S. Patent No. 5,446,726 | 08/29/1995 | Rostoker et al. | 370/17 |
| U.S. Patent No. 5,434,861 | 07/18/1995 | Pritty et al. | 370/85.8 |
| U.S. Patent No. 5,016,159 | 05/14/1991 | Maruyama | 364/200 |
| U.S. Patent No. 4,935,922 | 06/19/1990 | Wicklund et al. | 370/60 |
| U.S. Patent No. 4,933,937 | 06/12/1990 | Konishi | 370/85.13 |
| U.S. Patent No. 4,905,219 | 02/27/1990 | Barr et al. | 370/4 |
| U.S. Patent No. 4,901,308 | 02/13/1990 | Deschaine | 370/58.1 |
| U.S. Patent No. 4,878,216 | 10/31/1989 | Yunoki | 370/60 |
| U.S. Patent No. 4,849,962 | 07/18/1989 | Morimoto et al. | 370/29 |
| U.S. Patent No. 4,823,338 | 04/18/1989 | Chan et al. | 370/85 |
| U.S. Patent No. 4,797,879 | 01/10/1989 | Habbab et al. | 370/3 |
| U.S. Patent No. 4,744,078 | 05/10/1988 | Kowalczyk | 370/85 |
| U.S. Patent No. 4,737,953 | 04/12/1998 | Koch et al. | 370/94 |
| U.S. Patent No. 4,727,538 | 02/23/1988 | Furchtgott et al. | 370/85 |
| U.S. Patent No. 4,727,537 | 02/23/1988 | Nichols | 370/85 |
| U.S. Patent No. 4,723,311 | 02/02/1988 | Moustakas et al. | 455/612 |
| U.S. Patent No. 4,718,060 | 01/05/1988 | Oguchi et al. | 370/85 |
| U.S. Patent No. 4,715,030 | 12/22/1987 | Koch et al. | 370/85 |
| U.S. Patent No. 4,707,827 | 11/17/1987 | Bione et al. | 370/85 |
| U.S. Patent No. 4,706,081 | 11/10/1987 | Hart et al. | 340/825.03 |
| U.S. Patent No. 4,627,052 | 12/02/1996 | Hoare et al. | 370/88 |
| U.S. Patent No. 4,597,078 | 06/24/1986 | Kempf | 370/94 |

UNITED STATES PATENT AND TRADEMARK OFFICE
CERTIFICATE OF CORRECTION

PATENT NO. : 6,446,173 B1
DATED : September 3, 2002
INVENTOR(S) : Son Minh Pham

It is certified that error appears in the above-identified patent and that said Letters Patent is hereby corrected as shown below:

U.S. Patent No. 4,589,120     05/13/1986     Mendala          375/117
U.S. Patent No. 4,213,201     07/15/1980     Gagnier et al.   370/62
U.S. Patent Re 33,426         11/06/ 1990    Sugimoto et al.  370/85.14
U.S. Patent H586              pub. 02/07/1989 Kun             370/94 --

-- European Patent Document No. 0 642 246 A2 03/08/1995        H04L/29/06 --

OTHER PUBLICATIONS,
William Stallings, "Internetworking: A GuideTor the Perplexed," Telecommunications, North American Edition, Sept. 1989, pp. 25-30.;

Bob Stewart and Bill Hawe, "Local Area Network Applications," Telecommunications, North American Edition, Sept. 1984, pp. 96f-96j, and 96u.;

Bob Stewart, Bill Hawe, and Alan Kirby, "Local Area Network Connection," Telecommunications, North American Edition, Sept. 1984, pp. 54-55, 58-59 and 66.;

National Semiconductor, databook, "DP83934 SONIC™-T Systems-Oriented Network Interface Controller with Twisted Pair Interface," pp. 1-457 to 1-458, 1-468 to 1-477, 1-480, 1-512, 1-527- to 1-529.;

NEC Data Sheet, MOS Integrated Circuit $\mu$PD4516421, 4516821, 4516161 16M-bit Synchronous DRAM, November 1995.;

Printout of internet website http://www.ti.com/sc/docs/network/tswitch/product.htm#3150al, ThunderSWITCH Product Information, "ThunderSWITCH Product Descriptions," February 1997.;

Texas Instruments Product Preview SPWS 027, "TNETX3150 ThunderSWITCHTM 15-Port 10-/100-MBIT/S Ethernet™ Switch," pp. 1-85, September 1996. --

-- Hemant Kanakia and David R. Cheriton, "The VMP Network Adapter Board (NAB): High-Performance Network Communication for Multiprocessors," Computer Communications Review, vol. 18, no. 4, pp. 175-187, 1988. --

UNITED STATES PATENT AND TRADEMARK OFFICE
CERTIFICATE OF CORRECTION

PATENT NO. : 6,446,173 B1
DATED : September 3, 2002
INVENTOR(S) : Son Minh Pham

It is certified that error appears in the above-identified patent and that said Letters Patent is hereby corrected as shown below:

Column 4,
Line 56, delete "It., will" and insert -- It will --

Column 5,
Line 63, delete "interrupt; IRQ" and insert -- interrupt IRQ --

Column 11,
Line 15, delete "to each, destination port" and insert -- to each destination port --
Line 32, delete "the, packet buffers 206" and insert -- the packet buffers 206 --.

Column 20,
Line 3, delete "memory device, 200" and insert -- memory device 200 --
Line 58, delete "upon are next" and insert -- upon a next --

Column 27,
Line 8, delete "each write operation its performed" and insert -- each write operation is performed --

Signed and Sealed this

Thirty-first Day of August, 2004

JON W. DUDAS
*Director of the United States Patent and Trademark Office*